United States Patent
Araki et al.

(10) Patent No.: US 8,243,824 B2
(45) Date of Patent: Aug. 14, 2012

(54) INFORMATION PROCESSING APPARATUS AND METHOD

(75) Inventors: Junya Araki, Tokyo (JP); Kazuhisa Hosaka, Tokyo (JP); Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 884 days.

(21) Appl. No.: 12/353,479

(22) Filed: Jan. 14, 2009

(65) Prior Publication Data

US 2009/0180553 A1    Jul. 16, 2009

(30) Foreign Application Priority Data

Jan. 16, 2008 (JP) .............................. P2008-006531
Mar. 19, 2008 (JP) .............................. P2008-071639

(51) Int. Cl.
*H04N 11/04* (2006.01)

(52) U.S. Cl. .............. 375/240.26; 375/240.1; 375/240.2

(58) Field of Classification Search ............ 375/240.01–240.02, 240.19, 240.26
See application file for complete search history.

(56) References Cited

U.S. PATENT DOCUMENTS

| 2008/0131013 A1* | 6/2008 | Suino et al. ................... 382/240 |
| 2010/0142836 A1* | 6/2010 | Joshi et al. ................... 382/233 |

FOREIGN PATENT DOCUMENTS

| JP | 2002 135781 | 5/2002 |
| JP | 2004 194152 | 7/2004 |

OTHER PUBLICATIONS

Jerome M. Shapiro; Embedded Image Coding Using Zerotrees of Wavelet Coefficients; Dec. 1993; IEEE Transaction on signal processing; vol. 41; No. 12; pp. 5-8.*

Takayuki Nakachi, Tomoko Sawabe, Junji Suzuki and Tetsuro Fujii NTT Network Innovation Laboratories; A Study on Non-Octave Resolution Conversion Based on JPEG2000 Extensions; May 2004; IEEE International Conference ; vol. 3; pp. 1-4.*

* cited by examiner

*Primary Examiner* — Edan Orgad
*Assistant Examiner* — Fahimeh Mohammadi
(74) *Attorney, Agent, or Firm* — Frommer Lawrence & Haug LLP; William S. Frommer

(57) ABSTRACT

Disclosed herein is an information processing apparatus configured to process a code stream having a first resolution with data having the first resolution scalably encoded, including setting means, first creating means, authoring means, second creating means, and code stream replacing means.

12 Claims, 23 Drawing Sheets

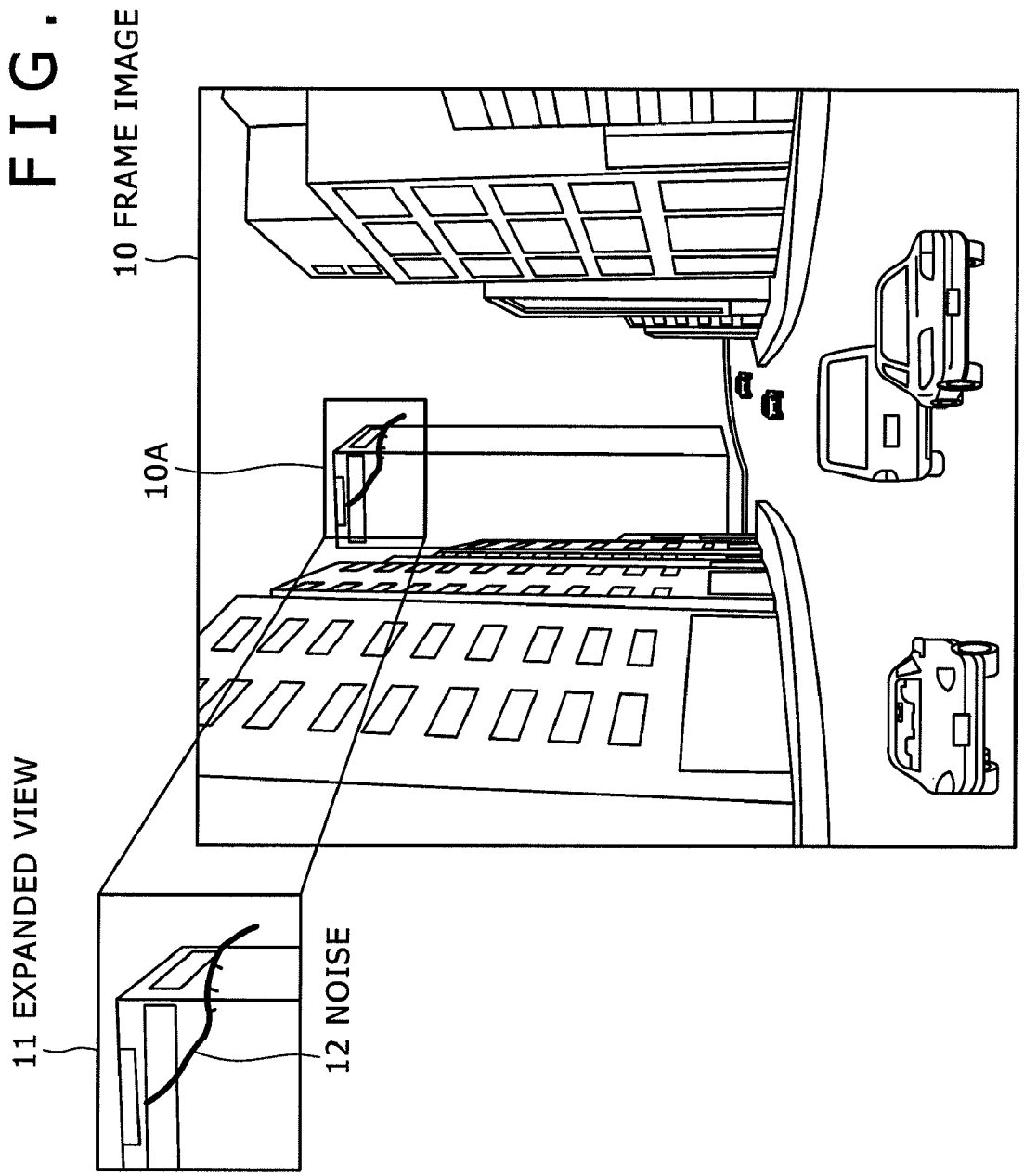

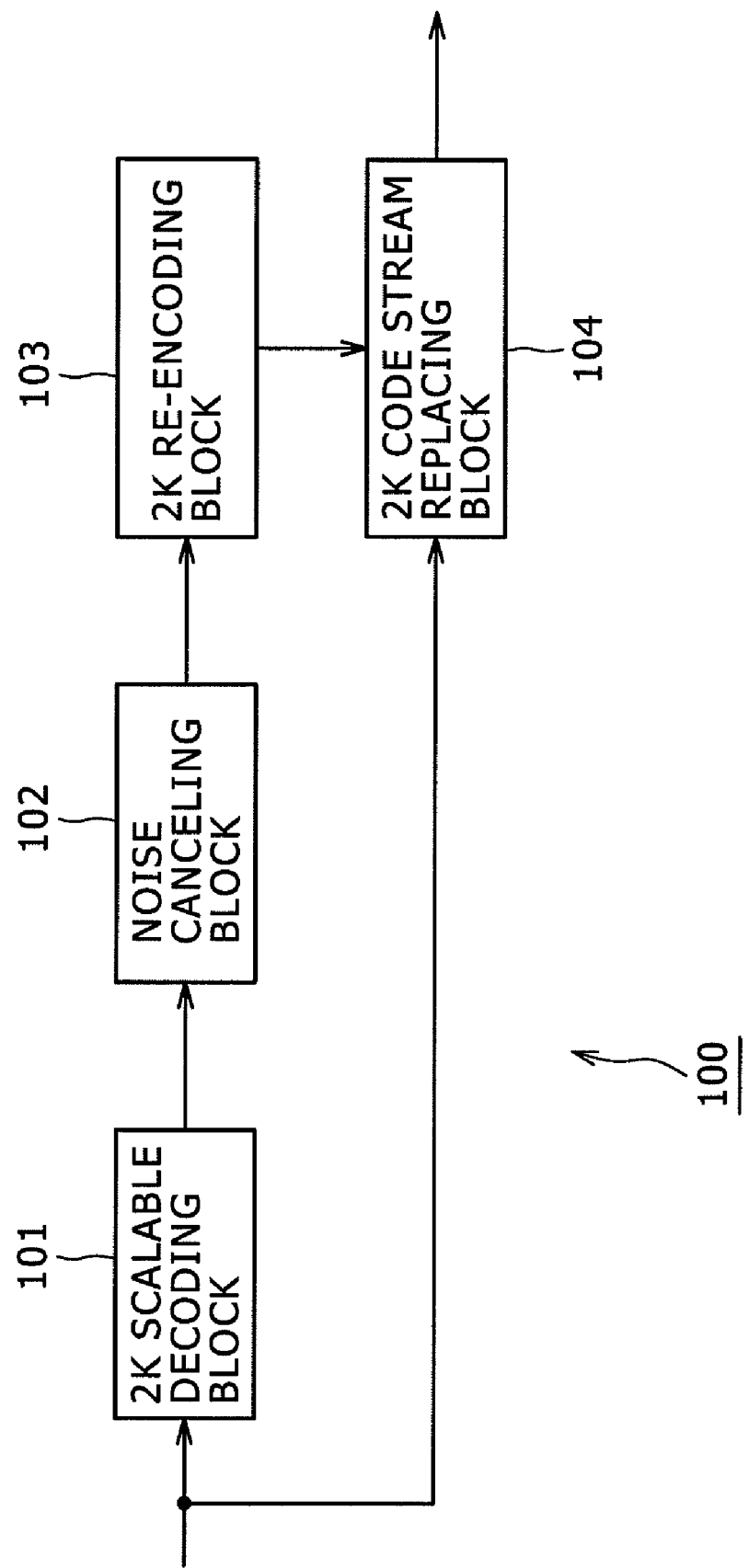

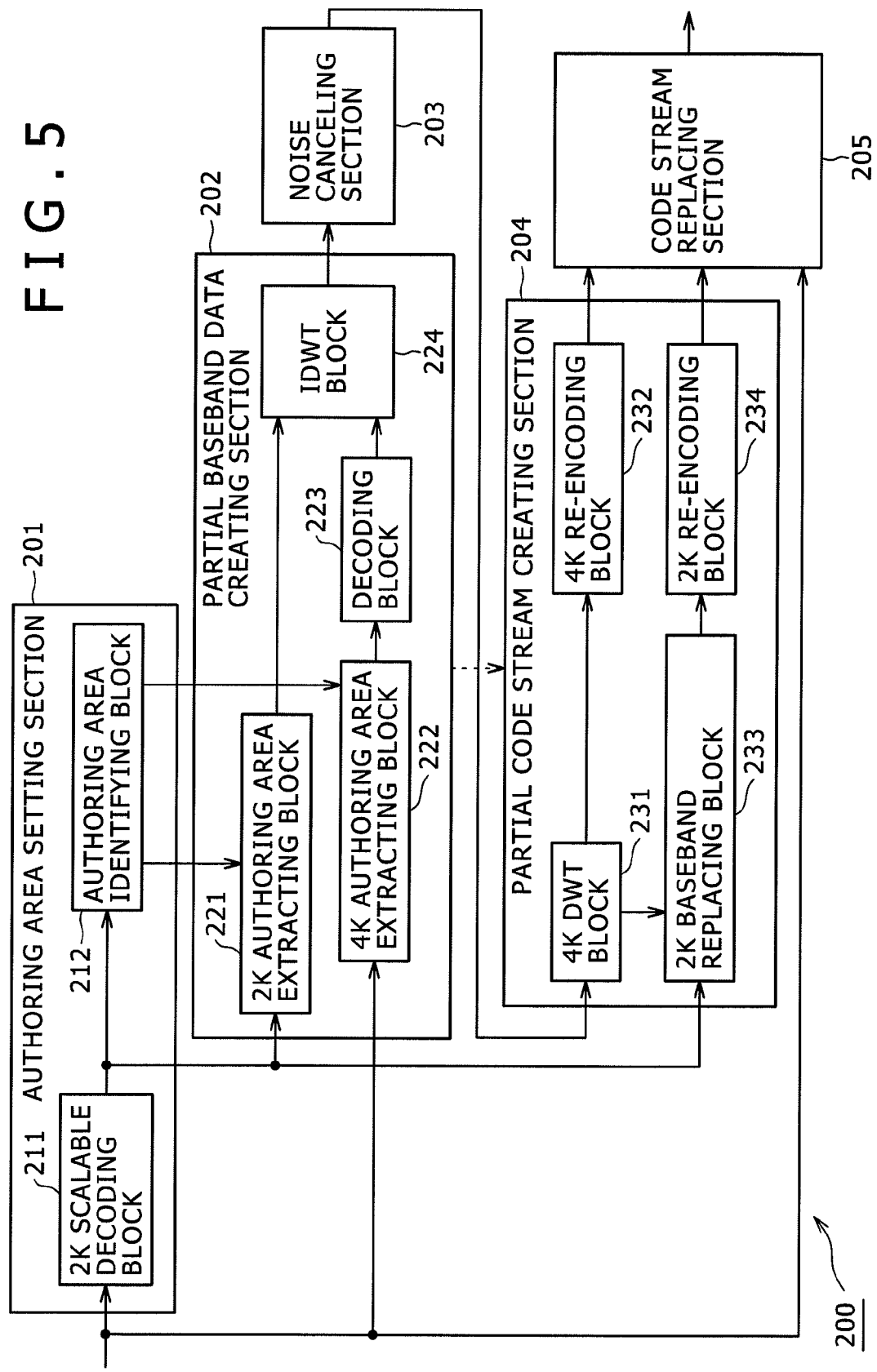

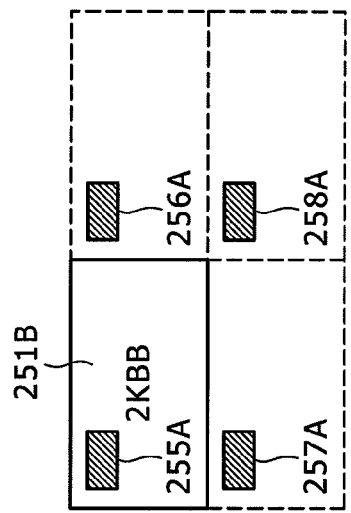
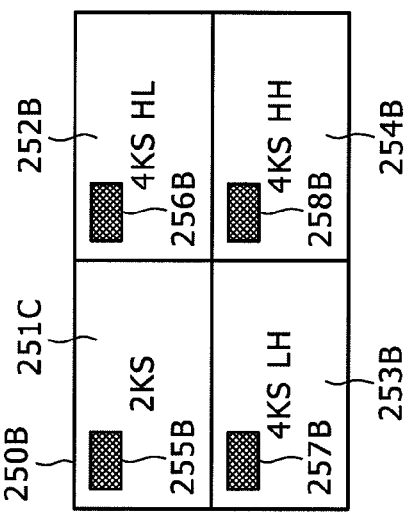
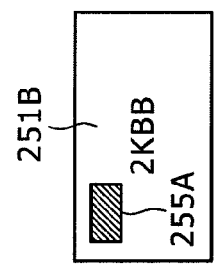
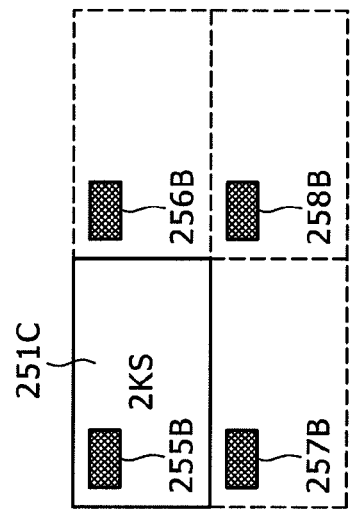
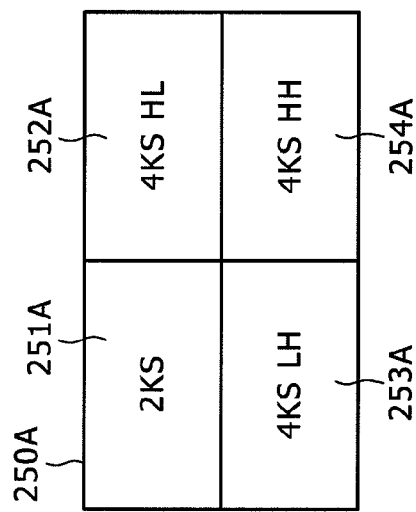

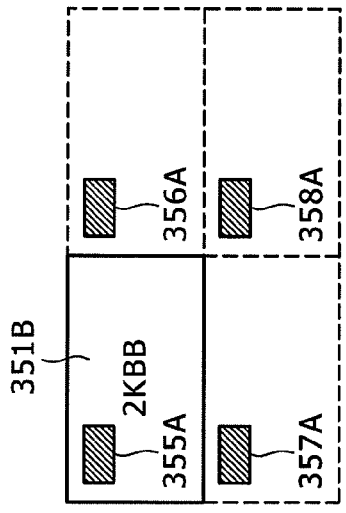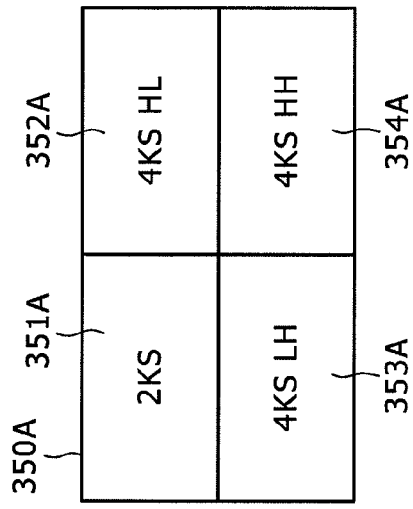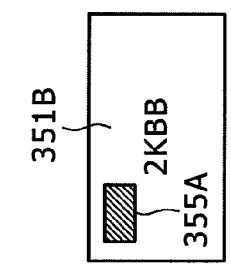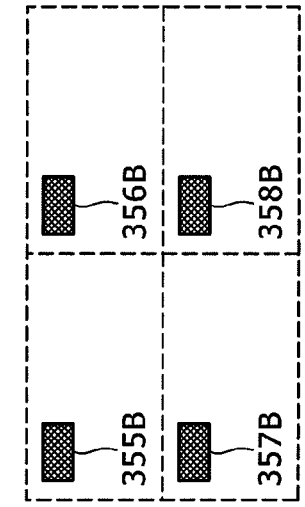

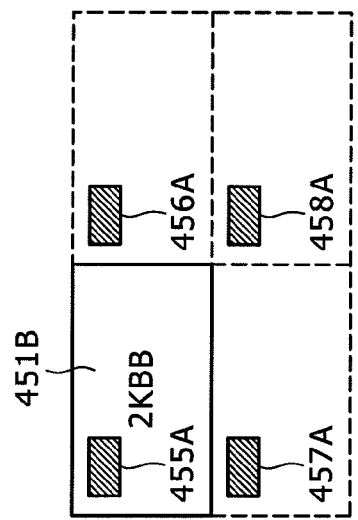
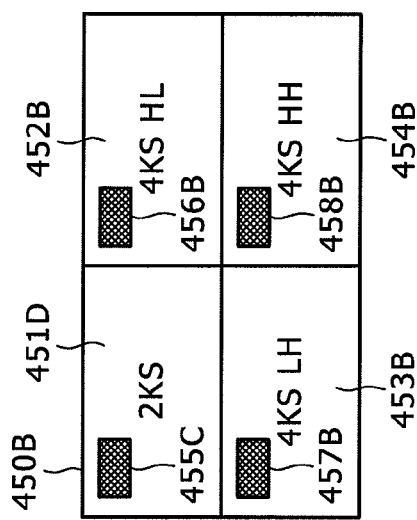
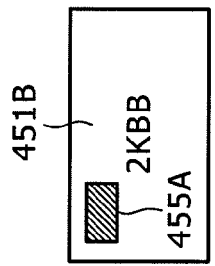
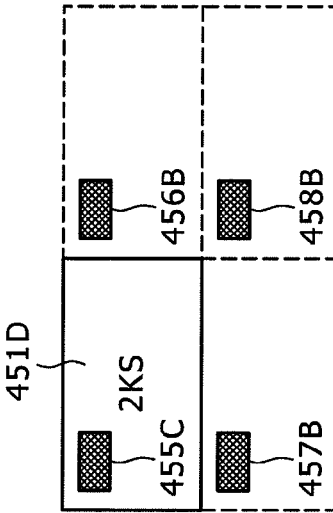
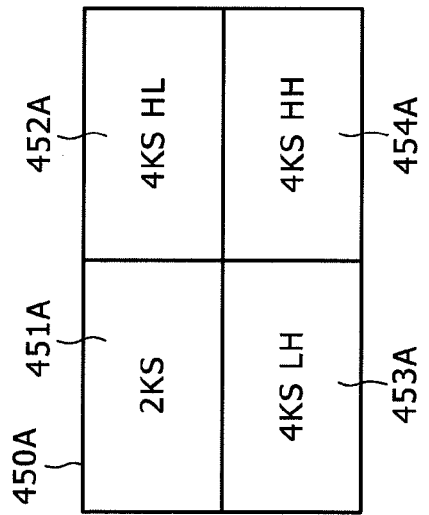
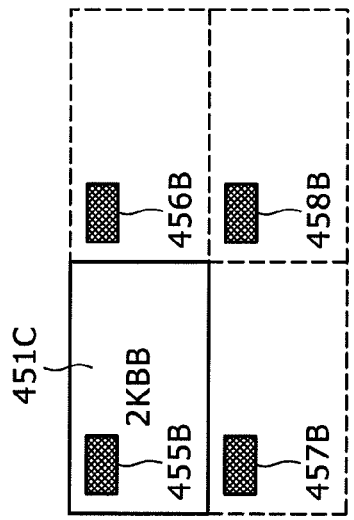

INFORMATION PROCESSING APPARATUS AND METHOD

CROSS REFERENCES TO RELATED APPLICATIONS

The present invention contains subject matter related to Japanese Patent Application JP 2008-071639 filed in the Japan Patent Office on Mar. 19, 2008, and Japanese Patent Application JP 2008-006531 filed in the Japan Patent Office on Jan. 16, 2008, the entire contents of which being incorporated herein by reference.

BACKGROUND OF THE INVENTION

1. Field of the Invention

The present invention relates to an information processing apparatus and method and a program and, more particularly, to an information processing apparatus and method and a program that are configured to facilitate the editing of scalably encoded code streams.

2. Description of the Related Art

Recently, the popularization of digital cinema based on digital data instead of films has been promoted in the production, delivery, and showing of movies. The standardization of digital cinema has been being specified by standardization organizations, such as DCI (Digital Cinema Initiative) composed of seven major U.S. movie delivery companies.

For example, the DCI standard laid down by DCI defines two image resolutions, 4K (4,096×2,160 pixels) and 2K (2,048×1,080 pixels) and specifies, for the video compression algorithm, the use of JPEG 2000 (Joint Photographic Experts Group 2000) for (scalably) encoding images so as to be able to decode with two or more resolutions (refer to Japanese Patent Laid-Open No. 2006-311327 for example).

In a work flow of digital cinema production, an image scanned from a film is captured in an image format of Tiff (Tagged Image File Format) or DPX (Digital Picture Exchange), for example, to be converted into non-compressed (or baseband) digital data (baseband data). This baseband data is managed as master data, on which authoring processing such as noise cancellation is executed.

Referring to FIG. 1, there is shown an example of how authoring processing is executed.

As shown in FIG. 1, a frame image 10 obtained by scanning a movie film may have a noise component caused by dust or damage for example on the scanned film. An expanded view 11 shows a noise-containing range 10A of the frame image 10. In the case of the example shown in FIG. 1, as shown in the expanded view 11, the frame image 10 has noise 12 caused by dust attached to the film. In a work flow of digital cinema production, the processing of removing such a noise component is executed (authoring processing).

However, as the resolution goes up to very high levels such as 4K for example, the amount of data increases accordingly, so that, if the baseband data is the master data, a storage capacity necessary for storing the master data, a network band necessary for transferring the master data, and a load and a processing time necessary for executing various processes on the master data increase accordingly.

Therefore, in order to decrease the amount of data, a method was proposed in which data (a code stream) compressed in a predetermined data compression algorithm such as JPEG 2000 for example is used for the master data. As described above, the JPEG 2000 standard is one of scalable coding methods, so that the JPEG 2000 is compliant with two or more resolutions such as 4K and 2K.

SUMMARY OF THE INVENTION

However, in the above-mentioned case, authoring processing such as noise cancellation is executed with the master data decoded with a maximum resolution. For example, if the resolution of each frame image is 4K, then the master data that is the digital data compressed by the JPEG 2000 algorithm (JPEG 2000 data) is decoded with 4K resolution to restore each frame image of 4K resolution. The authoring processing such as noise cancellation is executed on each frame image of the baseband of 4K resolution.

Thus, the scalably encoded data undergoes authoring processing after being decoded with a maximum resolution as with the data encoded by an unscalable coding algorithm. This related-art technique may involve a problem that, with scalably coded data, like the data encoded by an unscalable coding algorithm, as the data amount is increased by higher resolution, the load and processing time for decoding significantly increase, which in turn significantly increase the load and time for authoring processing.

Therefore, the embodiment of the present invention addresses the above-identified and other problems associated with related-art methods and apparatuses and solves the addressed problems by providing an information processing apparatus and method and a program that are configured to significantly facilitate the authoring processing of scalably encoded code streams by identifying an authoring position by use of baseband data of a low resolution and authoring the identified authoring position.

In carrying out the invention and according to a first mode thereof, there is provided an information processing apparatus configured to process a code stream having a first resolution with data having the first resolution scalably encoded. This information processing apparatus has setting means for decoding a code stream having the first resolution with a second resolution that is lower than the first resolution and setting an authoring area in which to execute authoring by use of decoded baseband data having the second resolution, first creating means for creating a partial baseband data having the first resolution, which is a part of the authoring area, of baseband data having the first resolution obtained by decoding a part of the authoring area of the code stream having the first resolution, authoring means for executing authoring on the partial baseband data having the first resolution, second creating means for scalably encoding the partial authored baseband data having the first resolution to create a partial code stream that is a code stream of the authoring area, and code stream replacing means for replacing the part of the authoring area of the code stream having the first resolution by the created partial code stream.

The above-mentioned first creating means has first extracting means for extracting the part of the authoring area from the baseband data having the second resolution, second extracting means for extracting the part of the authoring area from the code stream having the first resolution, decoding means for decoding the part of the authoring area of the code stream having the first resolution extracted by the second extracting means, and inverse wavelet transforming means for executing inverse wavelet transform on the part of the authoring area of the baseband data having the second resolution extracted by the first extracting means and the part of the authoring area of each high-frequency component subband having the first resolution obtained by decoding the part of the authoring area of the code stream having the first resolution by the decoding means to create a partial baseband data having the first resolution.

The above-mentioned authoring means executes authoring for canceling a noise component contained in the partial baseband data having the first resolution.

The above-mentioned second creating means has wavelet transforming means for executing wavelet transform on the authored partial baseband data having the first resolution with the first resolution, first encoding means for encoding the part of the authoring area of each high-frequency component subband having the first resolution obtained by the wavelet transform by the wavelet transforming means, baseband data replacing means for replacing the part of the authoring area of the baseband data having the second resolution obtained by decoding the code stream having the first resolution by the setting means with the second resolution by the part of the authoring area of the baseband data having the second resolution obtained by the wavelet transform executed by the wavelet transforming means, and second encoding means for encoding the baseband data having the second resolution with the part of the authoring area replaced.

The above-mentioned second creating means has wavelet transforming means for executing, with the first resolution, wavelet transform on the authored partial baseband data having the first resolution, first encoding means for encoding the part of the authoring area of each high-frequency component subband having the first resolution obtained by the wavelet transform executed by the wavelet transforming means, and second encoding means for encoding the part of the authoring area of the baseband data having the second resolution obtained by the wavelet transform executed by the wavelet transforming means.

In carrying out the invention and according to a second mode thereof, there is provided an information processing method for an information processing apparatus configured to process a code stream having a first resolution with data having the first resolution scalably encoded. This information processing method has the steps of: decoding a code stream having the first resolution with a second resolution that is lower than the first resolution and set an authoring area in which to execute authoring by use of decoded baseband data having the second resolution, creating a partial baseband data having the first resolution, which is a part of the authoring area, of baseband data having the first resolution obtained by decoding a part of the authoring area of the code stream having the first resolution, executing authoring on the partial baseband data having the first resolution, encoding scalably the partial authored baseband data having the first resolution to create a partial code stream that is a code stream of the authoring area, and replacing the part of the authoring area of the code stream having the first resolution by the created partial code stream.

In carrying out the invention and according to a third mode thereof, there is provided an information processing apparatus configured to process a code stream having a first resolution with data having the first resolution scalably encoded. This information processing apparatus has setting means for encoding a code stream having the first resolution with a second resolution that is lower than the first resolution and set an authoring area in which to execute authoring by use of obtained baseband data having the second resolution, extracting means for extracting a part of the authoring area from a code stream of each high-frequency component subband having the first resolution contained in the code stream having the first resolution, authoring means for executing authoring on the extracted part of the authoring area of the code stream of the each high-frequency component subband having the first resolution and a part of the authoring area of the baseband data having the second resolution, encoding means for scalably encoding the baseband data having the second resolution with the part of the authoring area authored, and replacing means for replacing the part of the code stream having the second resolution of the code stream having the first resolution by the code stream having the second resolution with the baseband data having second resolution with the part of the authoring area authored scalably encoded and replace a part of the authoring area of the code stream of the each high-frequency component subband having the first resolution contained in the code stream having the first resolution by the authored part of the authoring area of the each high-frequency component subband having the first resolution.

The above-mentioned authoring means executes authoring of canceling a noise component on both the part of the authoring area of the code stream of the each high-frequency component subband having first resolution and the authoring area of the baseband data having the second resolution.

The above-mentioned authoring means replaces the part of the authoring area of the code stream of each high-frequency component subband having the first resolution by another predetermined code stream to cancel the noise component.

In carrying out the invention and according to a fourth mode thereof, there is provided an information processing method for an information processing apparatus configured to process a code stream having a first resolution with data having the first resolution scalably encoded. This information processing method has the steps of encoding a code stream having the first resolution with a second resolution that is lower than the first resolution and set an authoring area in which to execute authoring by use of obtained baseband data having the second resolution, extracting a part of the authoring area from a code stream of each high-frequency component subband having the first resolution contained in the code stream having the first resolution, executing authoring on the extracted part of the authoring area of the code stream of the each high-frequency component subband having the first resolution and a part of the authoring area of the baseband data having the second resolution, encoding scalably the baseband data having the second resolution with the part of the authoring area authored, and replacing the part of the code stream having the second resolution of the code stream having the first resolution by the code stream having the second resolution with the baseband data having second resolution with the part of the authoring area authored scalably encoded and replacing a part of the authoring area of the code stream of the each high-frequency component subband having the first resolution contained in the code stream having the first resolution by the authored part of the authoring area of the each high-frequency component subband having the first resolution.

In the first and second modes of the present invention, a code stream having a first resolution is decoded with a second resolution that is lower than the first resolution, an authoring area in which authoring is executed is set by use of the obtained baseband data having the second resolution, a part of the authoring area of the code stream having the first resolution is decoded with the first resolution to create a partial baseband data having the first resolution that is a part of the authoring area of the decoded baseband data having the first resolution, authoring is executed on the partial baseband data having the first resolution, the authored partial baseband data having the first resolution is scalably encoded, a partial code stream that is a code stream of the authoring area is created, and the part of the authoring area of the code stream having the first resolution is replaced by the created partial code stream.

In the third and fourth modes of the present invention, a code stream having a first resolution is decoded with a second resolution that is lower than the first resolution. An authoring area in which authoring is executed is set by use of the obtained baseband data having the second resolution. A part of the authoring area is extracted from a code stream of each high-frequency component having the first resolution contained in the code stream having the first resolution, authoring is executed on both the extracted part of the authoring area of the code stream of each high-frequency component subband having the first resolution and the part of the authoring area of the baseband data having the second resolution, the baseband data having the second resolution with the part of the authoring area authored is scalably encoded, the part of the code stream having the second resolution is replaced by the code stream having the second resolution with the baseband data having the second resolution with the part of the authoring area authored scalably encoded, and the part of the authoring area of the code stream us each high-frequency component subband having the first resolution contained in the code stream having the first resolution is replaced by the part of the authoring area of the code stream of each high-frequency component subband having the first resolution with the part of the authoring area authored.

A network herein denotes a system in which at least two apparatuses are interconnected and information is transmitted from one to the other. The apparatuses communicating with each other via the network may be standalone apparatuses or component blocks internal to each apparatus.

Communication herein denotes may be either wireless or wired or both wireless and wired. In the latter case, a section of wireless communication and a section of wired communication exist at the same time or the outgoing communication from an apparatus is wireless and the incoming communication thereto is wired or vice versa.

As described and according to embodiments of the present invention, information can be processed, more particularly, the authoring of scalably encoded code streams is facilitated.

BRIEF DESCRIPTION OF THE DRAWINGS

FIG. 1 is a schematic diagram illustrating how authoring processing is executed;

FIG. 2 is a block diagram illustrating an exemplary main configuration of an image processing apparatus practiced as one embodiment of the invention;

FIG. 5 is a block diagram illustrating an exemplary configuration of an image processing apparatus practiced as another embodiment of the invention;

FIGS. 6A through 6G are diagrams illustrating data in authoring processing;

FIGS. 13A through 13G are diagrams illustrating data in authoring processing;

FIGS. 20A through 20F are diagrams illustrating data in authoring processing;

DETAILED DESCRIPTION OF THE PREFERRED EMBODIMENTS

Figure 3B:
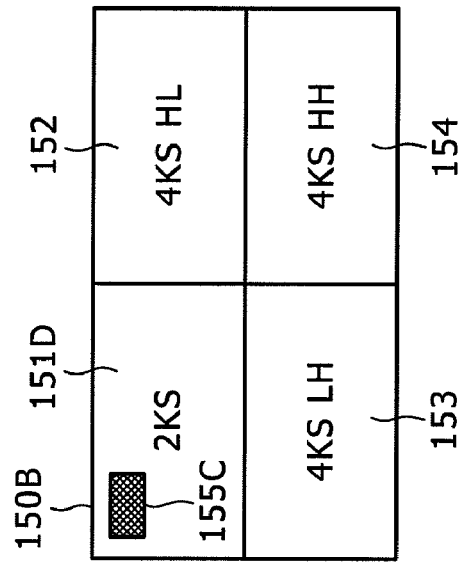
FIGS. 3A through 3D are diagrams illustrating data in authoring processing.

This invention will be described in further detail by way of embodiments thereof with reference to the accompanying drawings. Now referring to FIG. 2, there is shown a block diagram illustrating an exemplary main configuration of an image processing apparatus practiced as one embodiment of the invention. An image processing apparatus 200 shown in FIG. 2 is configured to cancel noise from each frames of image data.

Image data subject to processing is moving image data made up of frame images each having 4K (4,096×2,160 pixels) resolution obtained by scanning each frame of a moving film in a work flow of digital cinema production. This moving image data is compressed by the JPEG 2000 data compression algorithm in a scalable manner. To be more specific, this image data (or a code stream) is scalably compressed (or a resolution can be selected) so as to provide a baseband image of at least 4K or 2K (2,048×1,080 pixels) when decoded. In the JPEG 2000 standard, wavelet converting is used, in which a frequency component of each image is recursively resolved into a high frequency component and a low frequency component, so that, at the time of decoding, the baseband image can be obtained of any resolution selected from two or more levels.

For this scalably encoded code stream, the image processing apparatus 100 cancels a noise component, such as dust or scratch caused during scanning, for example, as described with reference to FIG. 1, from each frame image. At this time, the image processing apparatus 100 executes the noise cancellation in the frame image decoded with 2K resolution (namely, an image of low resolution) so as to reduce the load and processing time of decoding, noise cancellation, and re-encoding.

The image processing apparatus 100 has a 2K scalable decoding block 101, a noise canceling block 102, a 2K re-encoding block 103, and a 2K code stream replacing block 104 as main component blocks.

The 2K scalable decoding block 101 decodes a code stream entered in the image processing apparatus 100 to get a baseband frame image at 2K resolution. In JPEG 2000, the low-frequency component of image data is recursively separated by wavelet transform as described above to be encoded for each frequency band. Therefore, as shown in FIG. 3A, a code stream 150A for one frame of image data entered in the 2K scalable decoding block 101 is made up of a 2KS 151A that is a partial code stream obtained by encoding a subband (2K (4KLL)) that is a low frequency both vertically and horizontally, a 4KSHL 152 that is a partial code stream obtained by encoding a subband (4KHL) that is a high-frequency component horizontally and a low-frequency component vertically, a 4KSLH 153 that is a partial code stream obtained by encoding a subband (4KLH) that is a low-frequency component horizontally and a high-frequency component vertically, and a 4KSHH 154 that is a partial code stream obtained by encoding a subband (4KHH) that is a high-frequency component both horizontally and vertically which are obtained by wavelet-converting an image having 4K resolution once vertically and once horizontally.

In wavelet transform, image data is first separated into a high-frequency component and a low-frequency component, which are then down-sampled by ½. Namely, the baseband (2K) image obtained by decoding this 2KS 151A provides an image of 2K resolution. The 2K scalable decoding block 101 extracts the 2KS 151A from this code stream 150A, decodes the extracted 2KS 151A and wavelet-converts and decoded 2KS 151A, thereby obtaining the baseband data of the image having 2K resolution.

It should be noted that, in the normal case, wavelet transform is recursively repeated several times, so that a wavelet coefficient equivalent to 2KS 151A is further separated into two or more subbands to be encoded. Namely, the 2K scalable decoding block 101 extracts all code streams of these subbands, decodes the extracted code streams, and executes inverse wavelet transform on the decoded code streams.

The noise canceling block 102 execute noise cancellation on a baseband frame image of 2K resolution obtained by the 2K scalable decoding block 101. The noise canceling block 102 is supplied with the 2KBB 151B that is baseband data of frame image of 2K resolution as shown in FIG. 3B from the 2K scalable decoding block 101. By edge detection or comparison with an image at a same position between the preceding and succeeding frame images, for example, the noise canceling block 102 detects a noise component from this 2KBB 151B and sets an authoring area in which to execute noise cancellation processing such that the detected noise component is included. In addition, the noise canceling block 102 executes such authoring processing on that authoring area as filter processing and replacement of images at a same position or other images between the preceding and succeeding frame images, for example, thereby canceling noise.

Upon completion of the authoring processing of noise cancellation, the noise canceling block 102 supplies the baseband data of the noise-canceled frame image of 2K resolution to the 2K re-encoding block 103. Namely, as shown in FIG. 3C, the partial image 155A set to the authoring area shown in FIG. 3B is authored (or noise-canceled). The resultant image 2KBB 151C that is a partial image 155B is supplied to the 2K re-encoding block 103 from the noise canceling block 102.

The 2K re-encoding block 103 re-encodes, by JPEG 2000, the 2KBB 151C that is 2K-resolution baseband data with noise thereof canceled by the noise canceling block 102. The 2K code stream replacing block 104 replaces the 2K-resolution part of the code stream entered in the image processing apparatus 100 by the code stream obtained by the 2K re-encoding block 103 to generate a code stream with noise canceled at 2K resolution and outputs the generated code stream to the outside of the image processing apparatus 100.

Figure 3D:
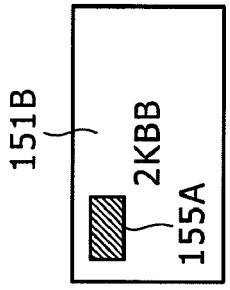
Figure 3A:
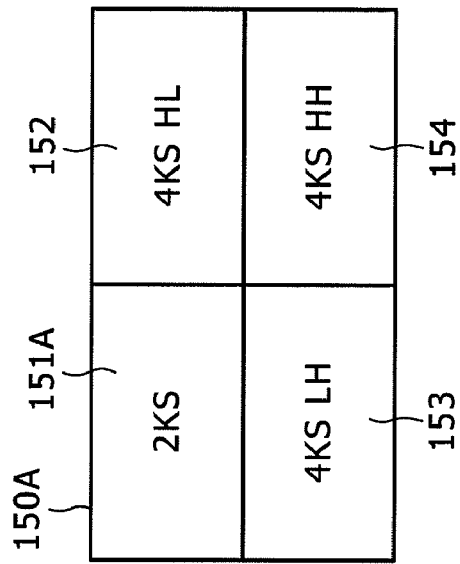
Figure 3C:
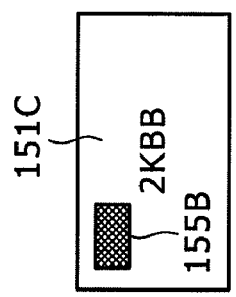

To be more specific, as shown in FIG. 3D, the 2K code stream replacing block 104 replaces the 2KS 151A of the code stream 150A shown in FIG. 3A by the 2KS 151D that is a code stream obtained by encoding, by JPEG 2000, a noise-canceled image of 2K resolution supplied from the 2K re-encoding block 103 to generate a code stream 150B with noise canceled at 2K resolution and outputs the generated code stream.

Figure 4:
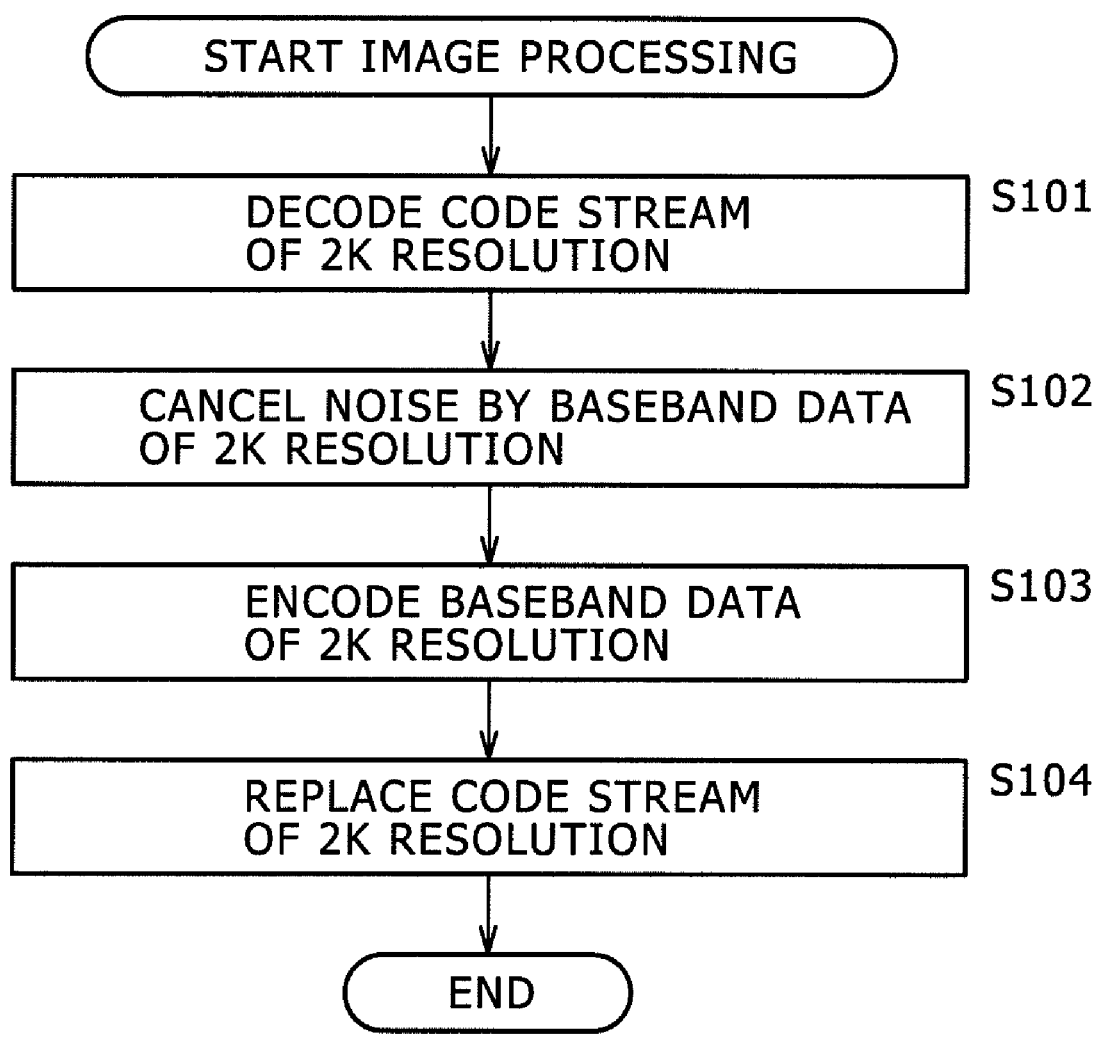
FIG. 4 is a flowchart indicative of an exemplary flow of image processing.

The following describes an example of the above-mentioned image processing for canceling a noise component from a frame image, with reference to a flowchart shown in FIG. 4.

When image processing starts, the 2K scalable decoding block 101 extracts a code stream of 2K resolution from an entered code stream and decodes the extracted code stream in step S101. In step S102, the noise canceling block 102 executes authoring processing for canceling a noise component from the baseband data of 2K resolution. In step S103, the 2K re-encoding block 103 scalably re-encodes, by JPEG 2000, the baseband data of 2K resolution with the noise component canceled to generate 2KS 151D encoded like the 2KS 151A. In step S104, the 2K code stream replacing block 104 replaces the code stream of 2K resolution of the code stream entered in the image processing apparatus 100 by the code stream with the noise component canceled and outputs the code stream 150B with the noise component canceled at 2K resolution, upon which the image processing comes to an end.

It should be noted that the above-mentioned image processing is executed for each frame image of the image data entered in the image processing apparatus 100.

As described above, the image processing apparatus 100 executes authoring processing for canceling a noise component at 2K resolution that is lower than the 4K resolution intrinsic to a frame image. Consequently, as compared with the decoding, noise cancellation, and re-encoding of a code stream with 4K resolution, the image processing apparatus 100 can significantly reduce the load, processing time, and data retaining memory capacity necessary for the code stream decoding, noise component cancellation, and baseband data re-encoding involved in this authoring processing. Namely, the image processing apparatus 100 can execute authoring processing more easily than the authoring processing to be executed with 4K resolution.

In the above-mentioned examples, a noise component is canceled at 2K resolution, however, it is also practicable to cancel a noise component from a code stream having 4K resolution.

Referring to FIG. 5, there is shown a block diagram illustrating another exemplary configuration of an image processing apparatus to which the embodiment of the present invention is applied. As with the image processing apparatus 100 shown in FIG. 2, an image processing apparatus 200 shown in FIG. 5 is configured to cancel noise from each frame image of image data. However, a noise component (an image of dust or damage on a film) included in each frame image created at 4K resolution is also generally included in a subband of each high-frequency component obtained by the wavelet transform of a frame image at 4K resolution. Therefore, the image processing apparatus 200 is configured to also cancel a noise component included in the subband of each high-frequency component having 4K resolution. In this noise cancellation, the image processing apparatus 200 detects noise in an image of 2K resolution to set an authoring area and restores the image of a base band having 4K resolution merely in that authoring area.

As shown in FIG. 5, the image processing apparatus 200 has an authoring area setting section 201, a partial baseband data creating section 202, a noise canceling section 203, a partial code stream creating section 204, and a code stream replacing section 205.

As in the case of the image processing apparatus 100, the authoring area setting section 201 generates baseband data of 2K resolution, detect a noise component in the generated baseband data, and sets an authoring area such that the detected noise component is included. The authoring area setting section 201 has a 2K scalable decoding block 211 and an authoring area identifying block 212.

As shown in FIG. 6A, a code stream 250A to be entered in the image processing apparatus 200 is obtained by encoding a frame image having 4K resolution by JPEG 2000 and is made up of a 2KS 251A that is a partial code stream obtained by encoding a subband (2K (4KLL)) that is a low frequency both vertically and horizontally, a 4KSHL 252A that is a partial code stream obtained by encoding a subband (4KHL) that is a high-frequency component horizontally and a low-frequency component vertically, a 4KSLH 253A that is a partial code stream obtained by encoding a subband (4KLH) that is a low-frequency component horizontally and a high-frequency component vertically, and a 4KSHH 254A that is a partial code stream obtained by encoding a subband (4KHH) that is a high-frequency component both horizontally and vertically which are obtained by wavelet-converting an image having 4K resolution once vertically and once horizontally.

Generally, wavelet transform is recursively repeated, so that the 2KS 251A is further separated into two or more subbands to be encoded.

Like the 2K scalable decoding block 101 shown in FIG. 2, the 2K scalable decoding block 211 extracts 2KS 251A from a code stream 205A entered in the image processing apparatus 200, decodes the extracted 2KS 251A, and executes inverse wavelet transform on the decoded code stream, thereby generating 2KBB 251B that is the baseband data of a frame image having 2K resolution (namely, a subband of a low-frequency component obtained by wavelet transform of 4K resolution).

In the baseband data of this frame image of 2K resolution, the authoring area identifying block 212 executes noise component detection processing by executing predetermined processing, such as edge detection and comparison between preceding and succeeding frame images, for example, and sets the authoring area such that the detected noise component is included. FIG. 6B shows an example in which a partial image 255A of 2KBB 251B is set to the authoring area.

The partial baseband data creating section 202 creates, in the frame data having 4K resolution, baseband data (a partial baseband data) of an image in the authoring area set by the authoring area setting section 201. The partial baseband data creating section 202 has a 2K authoring area extracting block 221, a 4K authoring area extracting block 222, a decoding block 223, and an IDWT (Inverse Discrete Wavelet Transform) block 224.

On the basis of coordinate information indicative of an authoring area obtained from the authoring area identifying block 212, the 2K authoring area extracting block 221 extracts data of the authoring area from the baseband data of the 2K frame image generated by the 2K scalable decoding block 211.

It should be noted that the partial baseband data extracted from the baseband data of a frame image of 2K resolution (or the subband of low-frequency component obtained by the wavelet transform of 4K resolution) is referred to as a partial baseband data of 2K resolution and a code stream of this partial baseband data is referred to as a partial code stream of 2K resolution.

On the basis of coordinate information indicative of an authoring area obtained by the authoring area identifying block 212, the 4K authoring area extracting block 222 extracts data of the authoring area from the code stream of each subband of the high-frequency component having 4K resolution included in the code stream entered in the image processing apparatus 200. At this moment, the 4K authoring area extracting block 222 executes the data extraction on a code block basis that is an encoding or decoding processing unit. Namely, the 4K authoring area extracting block 222 extracts data of a code block including the authoring area. The length of the code sequence of each code block is written to a packet header, so that the 4K authoring area extracting block 222 can analyze the packet header to access the code sequence on a code block basis.

Figure 7:
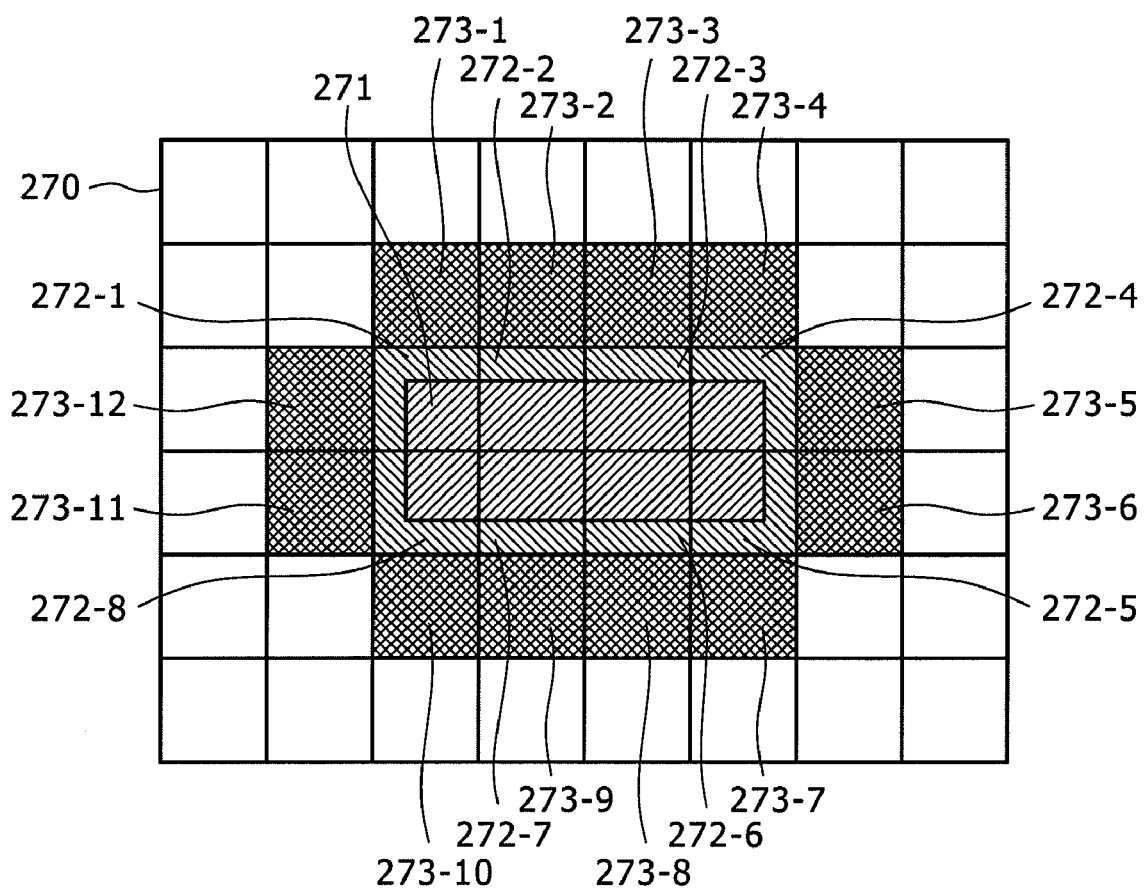
FIG. 7 is a diagram illustrating an exemplary range of code blocks to be extracted.

Also, at the above-mentioned time, the 4K authoring area extracting block 222 may consider an image boundary overlap of wavelet transform to widen an extraction range beyond the authoring area as shown in FIG. 7, for example. In the example shown in FIG. 7, in addition to code blocks 272-1 through 272-8 that include an authoring area 271, the 4K authoring area extracting block 222 appropriately extracts, of code blocks 273-1 through 273-12 around these code blocks, code blocks adjacent in the direction corresponding to the subband of these code blocks 273-1 through 273-12 (namely, code blocks affecting any of the code blocks 272-1 through 272-8 at the time of wavelet transform). It should be noted that, in this case, the 2K authoring area extracting block 221 also widens the extraction range in accordance with the 4K authoring area extracting block 222. Obviously, the widening of the extraction range can be executed with a desired scale. It is also practicable for the 4K authoring area extracting block 222 to expand the range more than surrounding two code blocks.

In what follows, the baseband data of a partial image of a frame image having 4K resolution is referred to as a partial baseband data having 4K resolution and the code stream of this partial baseband data is referred to as a partial code stream having 4K resolution.

In what follows, the partial baseband data extracted from each subband having high-frequency component obtained by wavelet transform of a frame image having 4K resolution is referred to as partial baseband data of a subband having 4K resolution and the code stream of this partial baseband data is referred to as a partial code stream of the subband having 4K resolution.

The decoding block 223 decodes the partial code stream of each subband having 4K resolution extracted by the 4K authoring area extracting block 222.

To be more specific, as shown in FIG. 6C, the 2K authoring area extracting block 221 extracts data (or a wavelet coefficient) of a partial image 255A from 2KBB 251B. Also, as shown in FIG. 6C, the 4K authoring area extracting block 222 extracts, from 4KSHL 252A, the partial code stream spatially corresponding to the partial image 255A on a code block basis and the decoding block 223 decodes the extracted code stream to get a partial wavelet coefficient 256A. Likewise, as shown in FIG. 6C, the partial code stream spatially corresponding to partial image 255A is extracted from 4KSLH 253A by the 4K authoring area extracting block 222 on a code block basis and the extracted partial code stream is decoded by the decoding block 223 to get a partial wavelet coefficient 257A and a partial code stream spatially corresponding to partial image 255A is extracted from 4KSHH 254A by the 4K authoring area extracting block 222 on a code block basis and the extracted partial code stream is decoded by the decoding block 223 to get a partial wavelet coefficient 258A.

The IDWT block 224 executes inverse wavelet transform on these partial image 255A and the partial wavelet coefficients 256A through 258A (the partial wavelet coefficients 255A through 258A) to create partial baseband data 261A (FIG. 6D) having 4K resolution of the authoring area.

Like the noise canceling block 102 shown in FIG. 2, the noise canceling section 203 executes authoring processing for canceling a noise component from the partial baseband data 261A in a predetermined method to get partial baseband data 261B (FIG. 6E) with the noise component canceled.

The partial code stream creating section 204 encodes the partial baseband data having 4K resolution with the noise component canceled by the JPEG 2000 standard to create a partial code stream having 4K resolution. The partial code stream creating section 204 has a 4KDWT (4K Discrete Wavelet Transform) block 231, a 4K re-encoding block 232, a 2K baseband replacing block 233, and a 2K re-encoding block 234.

The 4KDWT block 231 executes wavelet transform on partial baseband data 261B having 4K resolution with the noise component canceled by the noise canceling section 203, once vertically and once horizontally. The 4K re-encoding block 232 re-encodes each subband having high-frequency component obtained by the wavelet transform. Namely, the 4K re-encoding block 232 generates a partial code stream 256B, a partial code stream 257B, and a partial code stream 258B of the subband having 4K resolution shown in FIG. 6F.

It should be noted that the 4K re-encoding block 232 executes code block division for encoding at the same position as the code stream of the frame image of the original 4K resolution. It should also be noted that the code block decoded because of the overlap of wavelet transform is not included in the authoring area and therefore there is no change in the data before and after noise cancellation, so that there is no need to encode the code block again. If rate control is desired in irreversible coding, the 4K re-encoding block 232 makes the number of coding passes included in the code block the same as the number of code blocks of the code stream entered in the image processing apparatus 200. The number of coding passes included in the code block of the code stream entered in the image processing apparatus 200 can be obtained from the packet header of that code stream.

The 2K baseband replacing block 233 replaces data of the partial image 255A in the authoring area of the baseband data 251B (FIG. 6B) having 2K resolution generated in the 2K scalable decoding block 211 by a wavelet coefficient 255B (FIG. 6F) of low-frequency component vertically and horizontally obtained by the 4KDWT block 231. The 2K re-encoding block 234 re-encodes the baseband data of the frame image having 2K resolution by the JPEG 2000 standard (namely, the 2K re-encoding block 234 recursively executes wavelet transform to encode the obtained coefficient in a predetermined manner such that the same configuration as that of the code stream entered in the image processing apparatus 200 is obtained), thereby generating a code stream 251C (FIG. 6F) of the frame image having 2K resolution with the noise component canceled. At this moment, if rate control is desired in irreversible coding, the 2K re-encoding block 234, as in the case of the 4K re-encoding block 232, references the number of coding passes in the packet header of the code stream entered in the image processing apparatus 200 to match the values with each other.

The code stream replacing section 205 replaces the code stream 251A of the frame image having 2K resolution of the code stream 250A entered in the image processing apparatus 200 by the code stream 251C generated in the 2K re-encoding block 234. Also, the code stream replacing section 205 replaces a partial code stream in the authoring area of the 4KSHL 252A of the code stream 250A by the partial code stream 256B. Further, the code stream replacing section 205 replaces the partial code stream in the authoring area of the 4KSLH 253A of the code stream 250A by a partial code stream 257B. Still further, the code stream replacing section 205 replaces a partial code stream in the authoring area of the 4KSHH of the code stream 250A by a partial code stream 258B. Namely, the code stream replacing section 205 generates a code stream 250B with the noise component canceled as shown in FIG. 6G and outputs the generated code stream outside the image processing apparatus 200.

It should be noted that, at this moment, the replaced part of each code stream may change in the code length or zero bit plane count of each code block. Namely, these items of information may change before and after the replacement. If this happens, the code stream replacing section 205 rewrites the information, such as the code length and zero bit plane count in the packet header of the replaced part, at the same time.

The zero bit plane count denotes how many bit planes with all coefficient bits being 0's are located on the MSB (Most Significant Bit) side. A wavelet coefficient obtained by wavelet transform is encoded for each code block. In this encoding, each coefficient of this code block is divided for every bit, namely for every place, to be collected as a bit plane for every place. Namely, a bit plane denotes a collection of bits (coefficient bits) that are equal to each other in place in each coefficient of a certain code block. A bit plane with all coefficient value bits being 0's higher than the places of the bit planes formed at each place of coefficients is especially referred to as a zero bit plane. Namely, the zero bit plane count denotes the number of zero bit planes that continue from the MSB of coefficients.

In the replaced code block, the value of each coefficient changes before and after the replacement as described above, which may change the place of the MSB that is 1. Namely, the replacement may change the zero bit plane count of that code block. The information about zero bit plane count is written to the packet header of the code stream, so that, if at least a change occurred in the zero bit plane count as described above, the information in the packet header of the code stream have to be updated accordingly. Obviously, it is practicable to update the information in the packet header by calculating the number of zero bit planes for each replaced code block regardless of the change in zero bit plane count.

Figure 8:
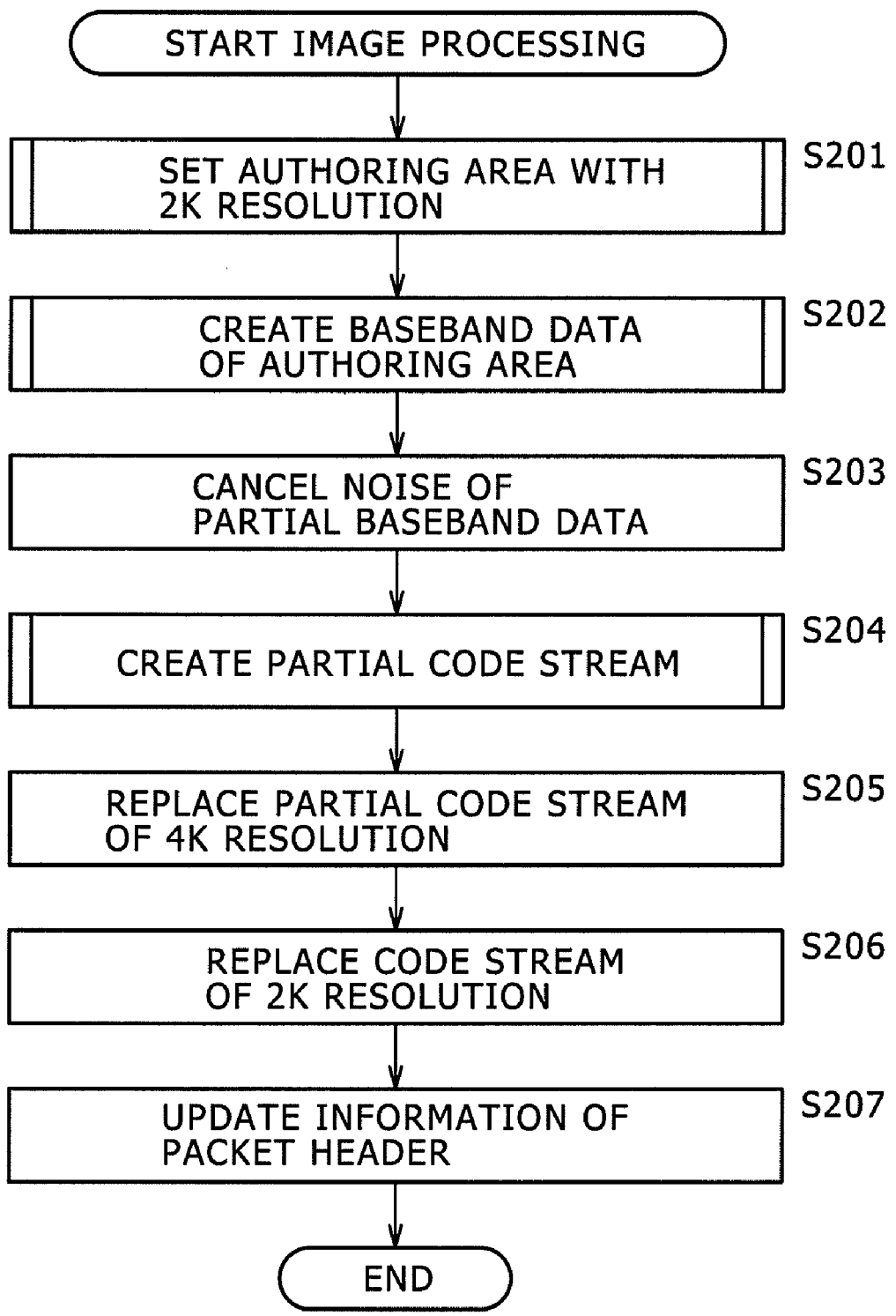
FIG. 8 is a flowchart indicative of another exemplary flow of image processing.

The following describes an exemplary flow of the above-mentioned image processing for canceling a noise component from a frame image, with reference to a flowchart shown in FIG. 8.

When the image processing starts, the authoring area setting section 201 executes authoring area setting processing in step S201, thereby setting an authoring area with 2K resolution. In step S202, the partial baseband data creating section 202 executes partial baseband data creating processing to create baseband data in the authoring area (namely, baseband data of the code block including the authoring area). In step S203, the noise canceling section 203 executes authoring processing for canceling the noise component of the created baseband data. In step S204, the partial code stream creating section 204 executes partial code stream creating processing to encode, by use of the JPEG 2000 standard, the partial baseband data with the noise component canceled, thereby creating a partial code stream.

In step S205, the code stream replacing section 205 identifies a part corresponding to the partial code stream supplied from the 4K re-encoding block 232 for each 4K-resolution subband of the code stream entered in the image processing apparatus 200 and replace the code stream of that part (namely, the code stream containing a noise component) by the partial code stream supplied from the 4K re-encoding block 232 (namely, the code stream with the noise component canceled). In step S206, the code stream replacing section 205 replaces the code stream of each subband having a resolution lower than 2K of the code stream entered in the image processing apparatus 200 (namely, the code stream containing a noise component) by the code stream supplied from the 2K re-encoding block 234 (namely, the code stream with the noise component canceled). Further, in step S207, the code stream replacing section 205 updates the information about code length and zero bit plane count in the packet header including the replaced code block.

When the process of step S207 has been completed, the above-mentioned image processing comes to an end. It should be noted that this image processing is executed for each frame image of the image data entered in the image processing apparatus 200.

Figure 9:
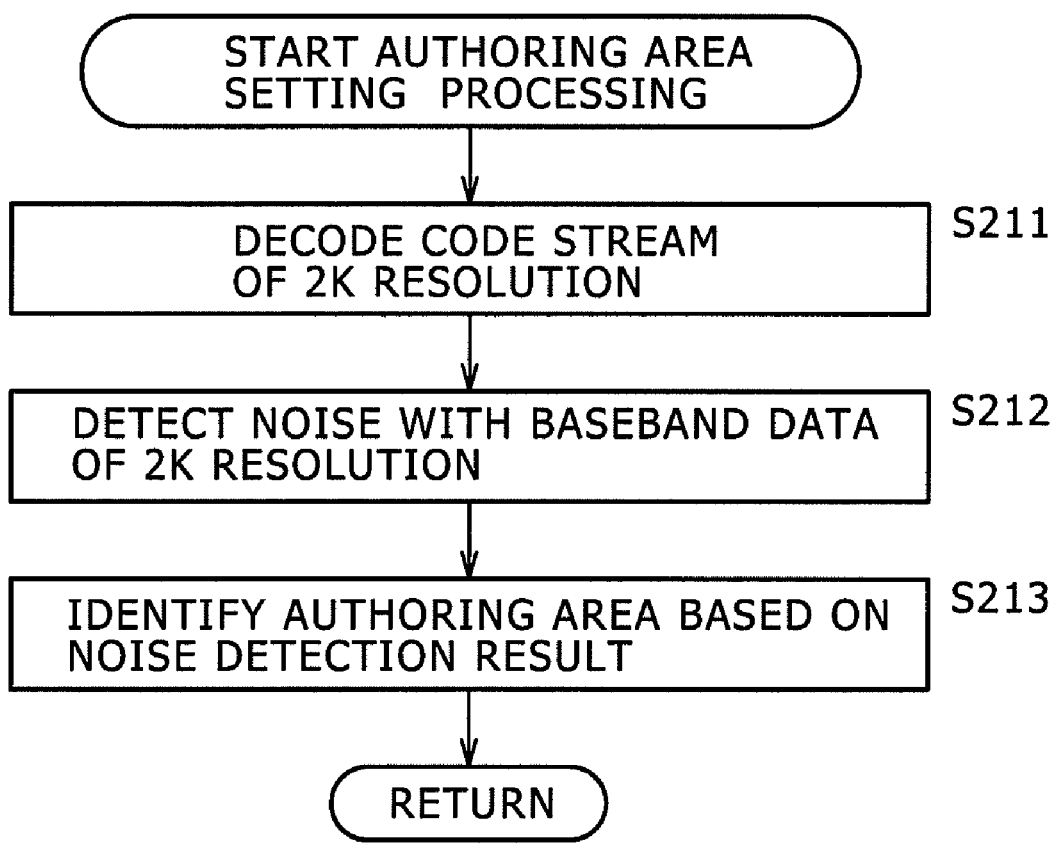
FIG. 9 is a flowchart indicative of an exemplary flow of authoring area setting processing.

The following describes an exemplary flow of authoring area setting processing that is executed in step S201 shown in FIG. 8, with reference to a flowchart shown in FIG. 9.

When authoring area setting processing starts, the 2K scalable decoding block 211 decodes a code stream having 2K resolution to execute inverse wavelet transform in step S211, thereby obtaining baseband data of a frame image having 2K resolution. In step S212, the authoring area identifying block 212 detects noise in the baseband data of the frame image having 2K resolution. In step S213, the authoring area identifying block 212 identifies an authoring area on the basis of a noise detection result and supplies the coordinate information of the identified authoring area to the 2K authoring area extracting block 221 and the 4K authoring area extracting block 222. When the process of step S213 has been completed, the above-mentioned authoring area setting processing comes to an end, upon which the procedure is returned to step S201 shown in FIG. 8 to repeat the processing from step S202.

Figure 10:
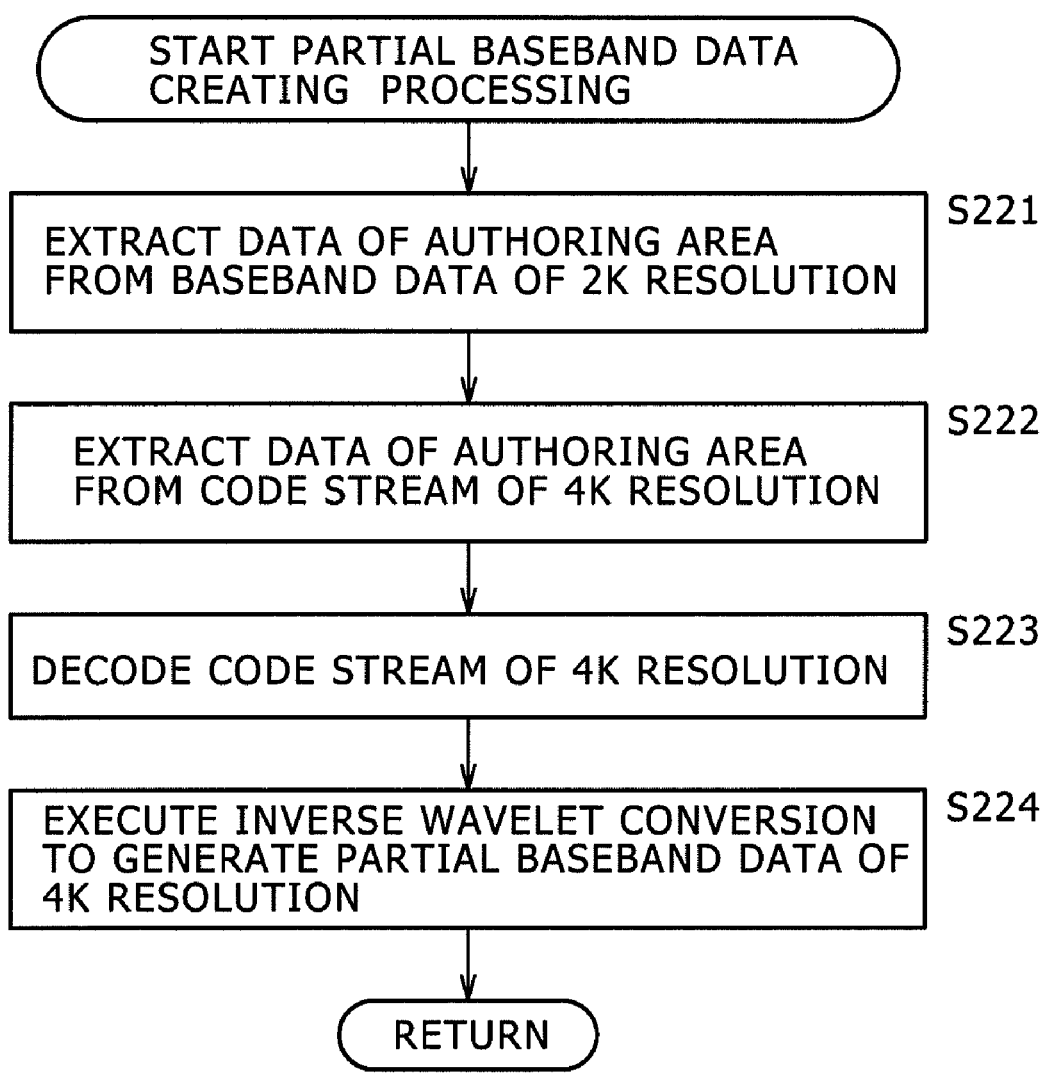
FIG. 10 is a flowchart indicative of an exemplary flow of partial baseband data creating processing.

The following describes an exemplary flow of partial baseband data creating processing that is executed in step S202 shown in FIG. 8, with reference to a flowchart shown in FIG. 10.

When the partial baseband data creating processing starts, the 2K authoring area extracting block 221 extracts data of a code block including the authoring area (namely, the partial baseband data having 2K resolution) from the baseband data of the frame image having 2K resolution in step S221. In step S222, the 4K authoring area extracting block 222 extracts data of a code block including the authoring area (the partial code stream of the subband having 4K resolution) from the code stream of the frame image having 4K resolution. In step S223, the decoding block 223 decodes the partial code stream of the subband having 4K resolution extracted in step S222. In step S224, the IDWT block 224 executes inverse wavelet transform by use of the partial baseband data having 2K resolution extracted in step S221 and the partial baseband data of the subband having 4K resolution extracted in step S223 to generate a partial baseband data having 4K resolution. When the process of step S224 has been completed, the partial baseband creating processing comes to an end, upon which the procedure is returned to step S202 shown in FIG. 8 to repeat the above-mentioned processing from step S203.

Figure 11:
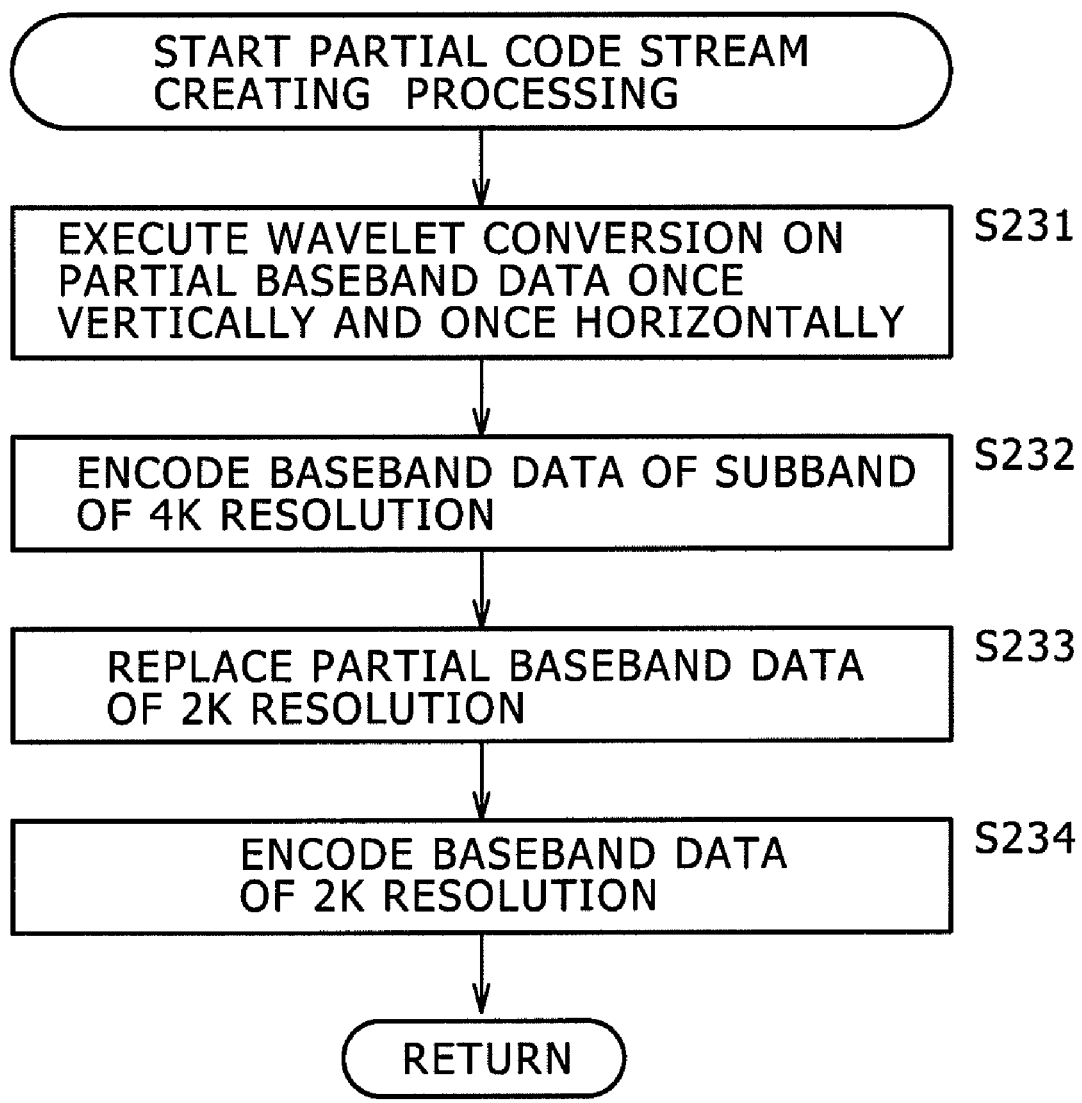
FIG. 11 is a flowchart indicative of an exemplary flow of partial code stream creating processing.

The following describes an exemplary flow of partial code stream creating processing that is executed in step S204 shown in FIG. 8, with reference to a flowchart shown in FIG. 11.

When the partial code stream creating processing starts, the 4KDWT block 231 executes wavelet transform on the partial baseband data having 4K resolution with the noise component canceled, once vertically and once horizontally in step S231. In step S232, the 4K re-encoding block 232 encodes the partial baseband data of the subband having 4K resolution generated in step S231. In step S233, the 2K baseband replacing block 233 replaces the partial baseband data in the authoring area of the baseband data of the frame image having 2K resolution obtained in the 2K scalable decoding block 211 by the partial baseband data having 2K resolution obtained in step S231 (namely, the baseband data with the noise component canceled). In step S234, the 2K re-encoding block 234 encodes the baseband data of the frame image having 2K resolution replaced in step S233. When the process of step S234 has been completed, the above-mentioned partial code stream creating processing comes to an end, upon which the procedure is returned to step S204 shown in FIG. 8 to repeat the above-mentioned processing from step S205.

As described above, the image processing apparatus 200 detects a noise component with 2K resolution that is lower than 4K resolution and decodes merely the part including the noise component with 4K resolution, thereby executing authoring processing. Consequently, as compared with the 4K-resolution decoding, noise component cancellation, and re-encoding of the code stream of an entire frame image, the image processing apparatus 200 can reduce the load of each process, the processing time, and the memory size necessary for data retention for the code stream decoding, noise component cancellation, and baseband data re-encoding that accompany this authoring processing. To be more specific, the image processing apparatus 200 can execute the authoring processing more easily than the manner of processing in which an entire frame is decoded with 4K resolution for authoring processing.

In the above-mentioned examples, each subband (2K) having 2K resolution is replaced in its entirety, however, it is also practicable to replace merely the part of each subband (2K) having 2K resolution that is in the authoring area (the namely, the code block containing the authoring area).

Figure 12:
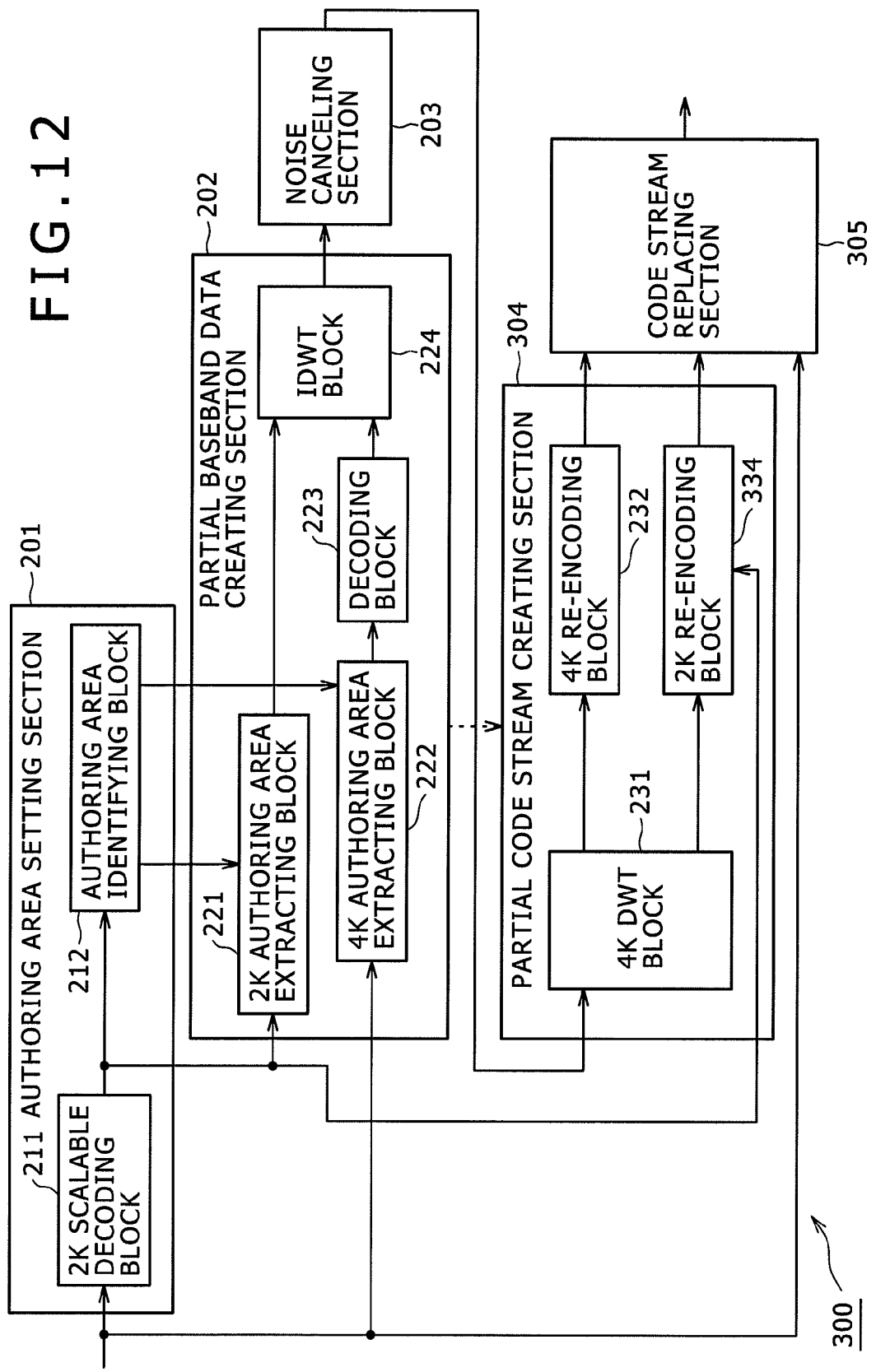
FIG. 12 is a block diagram illustrating an exemplary configuration of an image processing apparatus practiced as still another embodiment of the invention.

Referring to FIG. 12, there is shown a block diagram illustrating an exemplary configuration of an image processing apparatus practiced as still another embodiment of the invention. With reference to FIG. 12, components similar to those previously described with FIG. 5 are denoted by the same reference numerals. An image processing apparatus 300 shown in FIG. 12 is configured to cancel noise from each frame image of image data like the image processing apparatus 100 shown in FIG. 2. The image processing apparatus 300 has substantially the same configuration as that of the image processing apparatus 200 shown in FIG. 5 to do substantially the same processing. The image processing apparatus 300 has a partial code stream creating section 304 and a code stream replacing section 305 instead of the partial code stream creating section 204 and the code stream replacing section 205 of the image processing apparatus 200, respectively.

Whereas the partial code stream creating section 204 shown in FIG. 5 generates a code stream of a frame of 2K resolution with noise canceled, the partial code stream creating section 304 generates a partial code stream of a 2K-resolution code block containing an authoring area and supplies the generated partial code stream to the code stream replacing section 305.

The partial code stream creating section 304 has a 2K re-encoding block 334, in addition to the 4KDWT block 231 and the 4K re-encoding block 232. The 2K re-encoding block 334 further recursively executes wavelet transform on partial baseband data having 2K resolution obtained by executing wavelet transform on partial baseband data having 4K resolution in the 4KDWT block 231 so as to provide substantially the same subband configuration as that of the code stream entered in the image processing apparatus 300 and encodes an obtained coefficient in a predetermined manner (JPEG 2000), thereby creating a partial code stream having 2K resolution. Namely, the partial code stream creating section 304 supplies the partial code stream of each subband having 4K resolution and the partial code stream having 2K resolution to the code stream replacing section 305.

It should be noted that a detail configuration of the 2K re-encoding block 334 and detail processing to be executed thereby will be described later.

The code stream replacing section 305 replaces a part including a noise component of the code stream entered in the image processing apparatus 300 by a partial code stream of each subband having 4K resolution with the noise component canceled and the partial code stream having 2K resolution supplied from the partial code stream creating section 304 and outputs these code streams outside the image processing apparatus 300.

A code stream 350A to be entered in the image processing apparatus 300 is made up of 2KS 351A that is a code stream having 2K resolution, 4KSHL 352A, 4KSLH 353A, and 4KSHH 354A that are code streams of the subband having 4K resolution, as shown in FIG. 13A. As shown in FIG. 13B, 2KBB 351B that is baseband data of a 2K frame image having 2K resolution is created by a 2K scalable decoding block 211 and an authoring area containing the noise component is set by a authoring area identifying block 212 (a partial image 355A shown in FIG. 13B).

As shown in FIG. 13C, the partial image 355A having 2K resolution is extracted by the 2K authoring area extracting block 221, the partial code stream of each subband having 4K resolution spatially corresponding to the partial image 355A having 2K resolution is extracted by the 4K authoring area extracting block 222 and the extracted partial image and code stream are decoded by the decoding block 223, thereby generating a partial wavelet coefficient 356A, a partial wavelet coefficient 357A, and a partial wavelet coefficient 358A of the subbands having 4K resolution. The IDWT block 224 executes inverse wavelet transform on these partial baseband data to generate partial baseband data 361A (FIG. 13D) having 4K resolution.

The noise canceling section 203 cancels a noise component from this partial baseband data 361A having 4K resolution (namely, partial baseband data 361B having 4K resolution shown in FIG. 13E).

The 4KDWT block 231 executes wavelet transform on this partial baseband data 361B once vertically and once horizontally. The 4K re-encoding block 232 encodes a partial wavelet coefficient of each subband having 4K resolution obtained by this wavelet transform and the 2K re-encoding block 334 encodes, by JPEG 2000, the partial baseband data having 2K resolution obtained by this wavelet transform such that substantially the same configuration as that of the code stream entered in the image processing apparatus 300 is provided. As shown in FIG. 13F, these processing operations generate a partial code stream 355B having 2K resolution, a partial code stream 356B having 4K resolution, a partial code stream 357B having 4K resolution, and a partial code stream 358B having 4K resolution. Actually, however, the partial code stream 355B is divided for each subband by wavelet transform.

The code stream replacing section 305 replaces the partial code stream on the basis of the coordinate information by the code stream at the spatially corresponding position to generate a code stream 350B with the noise-containing code stream replaced by the partial code stream with noise canceled, outputting the generated code stream.

It should be noted that the code stream replacing section 305 updates the information about code length and zero bit plane count included in the packet header of the part with the data replaced.

Figure 14:
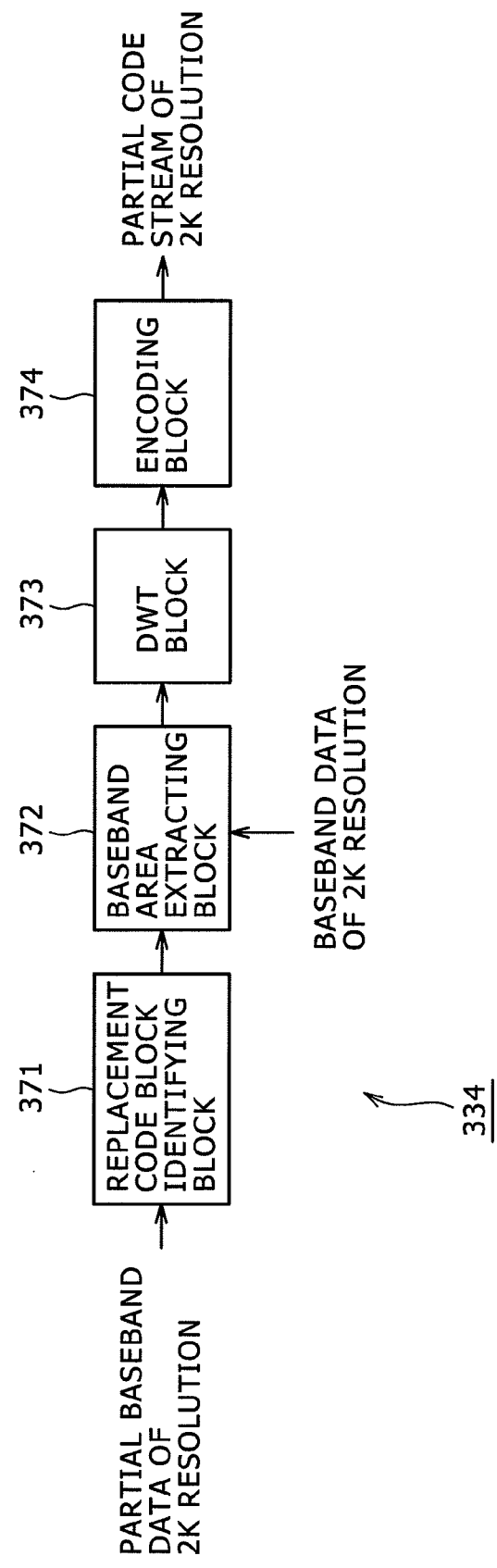
FIG. 14 is a block diagram illustrating an exemplary detail configuration of a 2K encoding block shown in FIG. 12.

Referring to FIG. 14, there is shown a block diagram illustrating a detail exemplary configuration of the 2K re-encoding block 334 shown in FIG. 12. As shown in FIG. 14, the 2K re-encoding block 334 has the replacement code block identifying block 371, a baseband area extracting block 372, a DWT (Discrete Wavelet Transform) block 373, and an encoding block 374.

On the basis of the partial baseband data supplied from the 4KDWT block 231, a replacement code block identifying block 371 identifies, on code block basis, the part subject to replacement of the code stream entered in the image processing apparatus 300.

For example, assume that an image 380 be a 2K-resolution image outputted from the 2K scalable decoding block 211 and an area 381 indicated by upper-right-to-lower-left slashes be a part on which image processing such as noise cancellation was made. The 2K re-encoding block 334 executes wavelet transform on this baseband data having 2K resolution, and encodes the obtained coefficient for each subband on a code block basis.

Figure 15A:
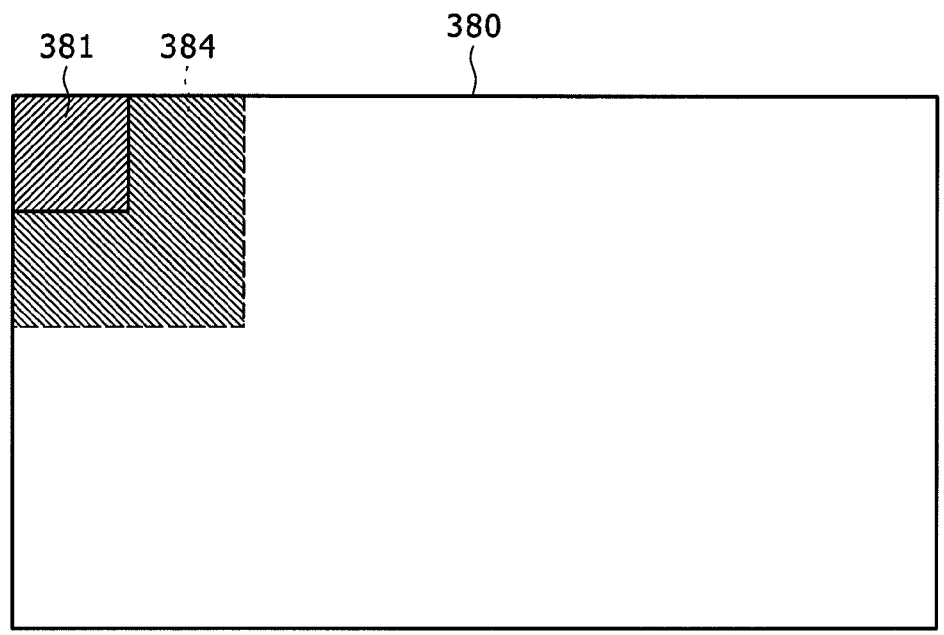
FIG. 15 is a diagram illustrating code blocks in an exemplary manner.
Figure 15B:
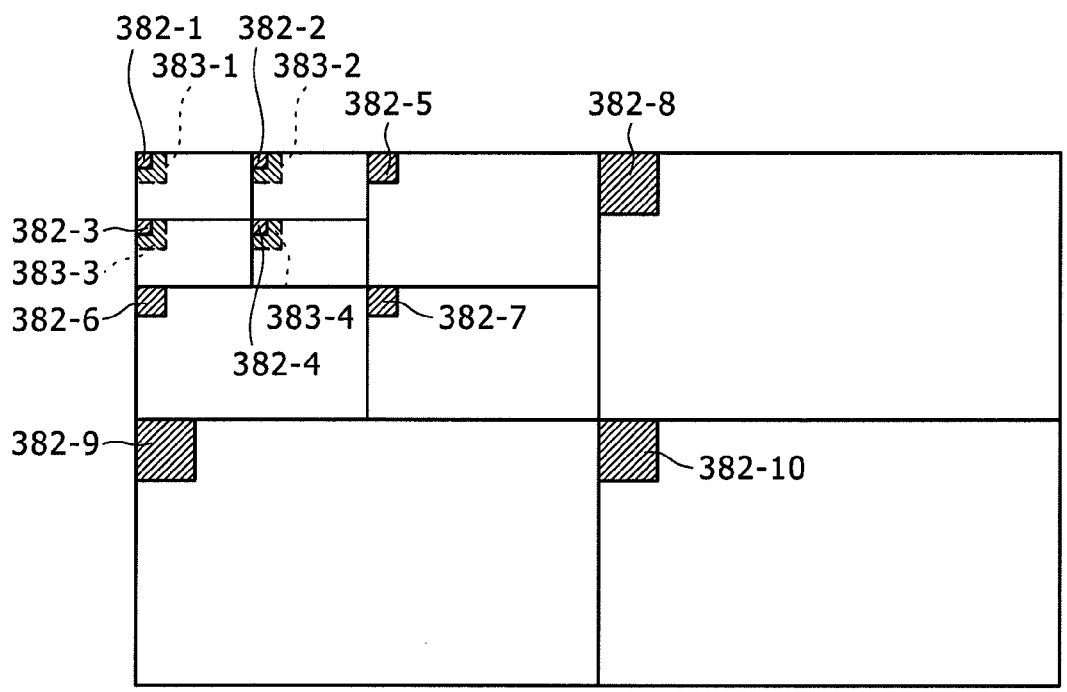

When wavelet transform has been executed on the partial baseband data of the area 381, wavelet coefficients for the subbands are obtained as coefficients 382-1 through 382-10 indicated by upper-right-to-lower-left slashes as shown in FIG. 15B, for example. If the range of the coefficients of the subbands is narrower than the code block unit, then the coefficients in that range are also desired to encode the 382-1 through 382-10. For example, in FIG. 15B, it is assumed that in the lowest subband as code blocks 383-1 through 383-4 indicated by lower-right-to-upper-left slashes, the code block be greater than coefficients 382-2 through 382-4.

As described above, since encoding and decoding are executed in this code block unit, a change of coefficients 382-1 through 382-4 affects all the coefficients contained in the range of code block 383-1 through 383-4, in this case. Namely, in the baseband level, the influence reaches the data in an area 384 indicted by lower-right-to-upper-left slashes as shown in FIG. 15A.

To be more specific, replacement of the data of the area 381 desires the replacement of all data of the area 384. Thus, the limitations on the processing data unit (namely, a code block) at the time of encoding and decoding cause limitations of processing data unit for the replacement of the code streams of subbands.

Therefore, the replacement code block identifying block 371 first identifies, in each subband, a code block (a replacement code block) that is affected by coefficients (coefficients 382-1 through 382-10 in the example shown in FIG. 15B) that is obtained by executing wavelet transform on the partial baseband data (the area 381 in the example shown in FIG. 15) supplied from the 4KDWT block 231 by encoding in the subbands.

Namely, the replacement code block identifying block 371 identifies, in the lowest subband, a code block containing the coefficients that are obtained by executing wavelet transform on the partial baseband data supplied from the 4KDWT block 231 and then identifies, in each upper subband, a code block (a code block on which inverse wavelet transform is executed by use of that lowest code block) corresponding to that lowest code block.

The replacement code block identifying block 371 supplies the information associated with the code blocks thus identified to the baseband area extracting block 372. On the basis of the information associated with replacement code blocks supplied from the replacement code block identifying block 371, the baseband area extracting block 372 identifies an area corresponding to the replacement code block of the 2K-resolution baseband data supplied from the 2K scalable decoding block 211, thereby extracting the data of that area. The baseband area extracting block 372 supplies the extracted 2K-resolution partial baseband data to the DWT block 373. The DWT block 373 executes wavelet transform on the 2K-resolution partial baseband data supplied from the baseband area extracting block 372 and supplies an obtained coefficient to the encoding block 374. The encoding block 374 encodes the coefficient data supplied from the DWT block 373 to generate a partial code stream having 2K resolution and supplies the generated partial code stream to the code stream replacing section 305 (FIG. 12).

Figure 16:
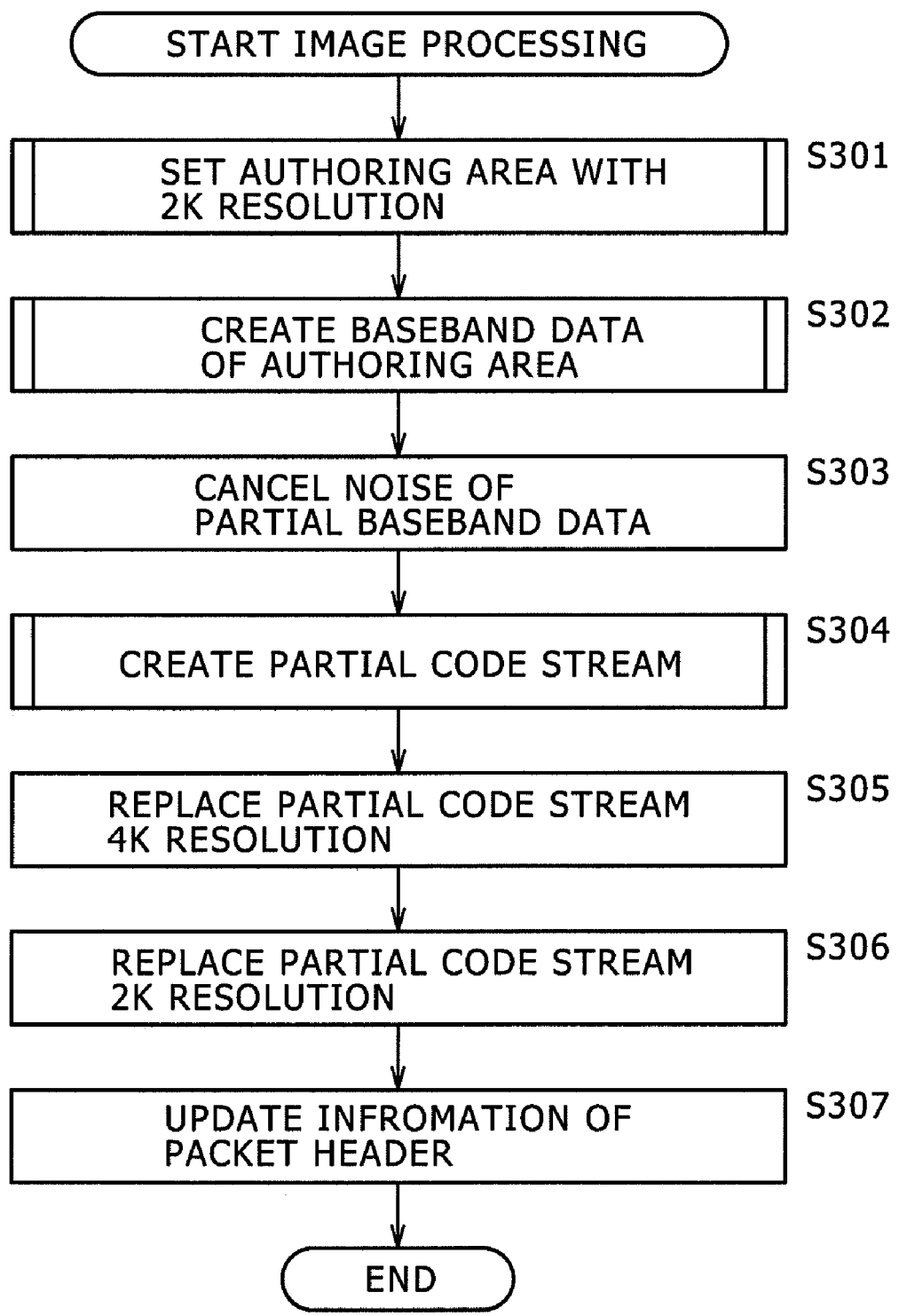
FIG. 16 is a flowchart indicative of another exemplary flow of image processing.

The following describes an exemplary flow of the above-mentioned image processing in which a noise component is canceled from a frame image, with reference to a flowchart shown in FIG. 16.

The processes shown in steps S301 through S303 are executed in substantially the same manner as those of steps S201 through S203 shown in FIG. 8. In step S304, the partial code stream creating section 304 executes partial code stream creating processing and encodes, by JPEG 2000, the partial baseband data with the noise component canceled, thereby creating a partial code stream.

In step S305, for each 4K-resolution subband of the code stream entered in the image processing apparatus 200, the code stream replacing section 305 identifies a part that spatially corresponds to the partial code stream of each 4K-resolution subband generated in step S304 and replaces this part (namely, a code stream containing a noise component) by the partial code stream (namely, the code stream with the noise component canceled) of each 4K-resolution subband generated in step S304. Also, in step S306, for each subband having a resolution lower than 2K in the code stream entered in the image processing apparatus 200, the code stream replacing section 305 identifies a part that spatially corresponds to the partial code stream of each subband having a resolution lower than 2K generated in step S304 and replaces this part (namely, a code stream containing a noise component) by the partial code stream (namely, the code stream with the noise component canceled) of each subband having a resolution lower than 2K generated in step S304. Further, in step S307, the code stream replacing section 305 updates the information associated with code length and zero bit plane count in the packet header containing the replaced code block.

When the process of step S307 has been completed, the above-mentioned image processing comes to an end. It should be noted that this image processing is executed for each frame image of image data that is entered in the image processing apparatus 300.

Figure 17:
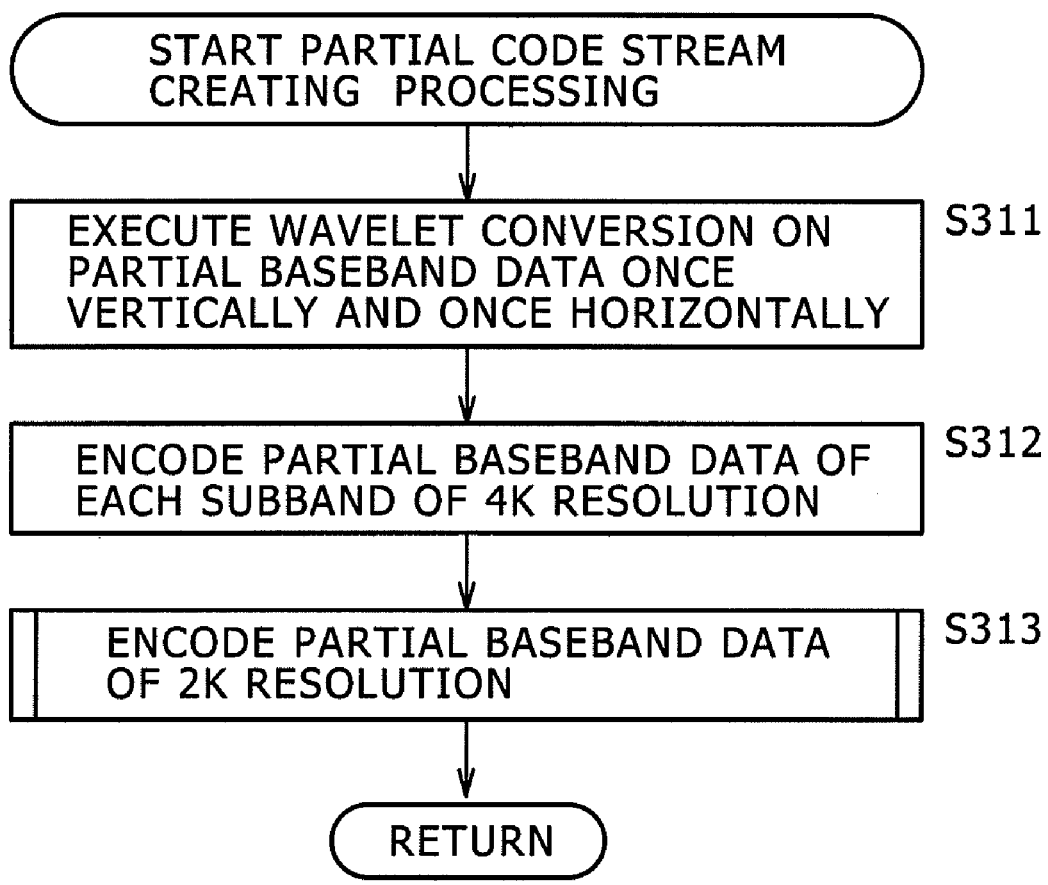
FIG. 17 is a flowchart indicative of another example flow of partial code stream creating processing.

The following describes an exemplary flow of partial code stream creating processing that is executed in step S304 shown in FIG. 16, with reference to a flowchart shown in FIG. 17.

When partial code stream creating processing starts, the 4KDWT block 231 executes wavelet transform 4K resolution partial baseband data with the noise component canceled, once vertically and once horizontally, in step S311. In step S312, the 4K re-encoding block 232 encodes the partial baseband data of each subband having 4K resolution generated in step S311. In step S313, the 2K re-encoding block 334 recursively executes wavelet transform on the partial baseband data having 2K resolution generated in step S311 such that substantially the same configuration as that of the code stream entered in the image processing apparatus 300 is provided and encodes the obtained coefficient by a predetermined method. When the process of step S313 has been completed, the partial code stream creating processing comes to an end, upon which the procedure is returned to step S304 shown in FIG. 16 to repeat the above-mentioned processing from step S305.

Figure 18:
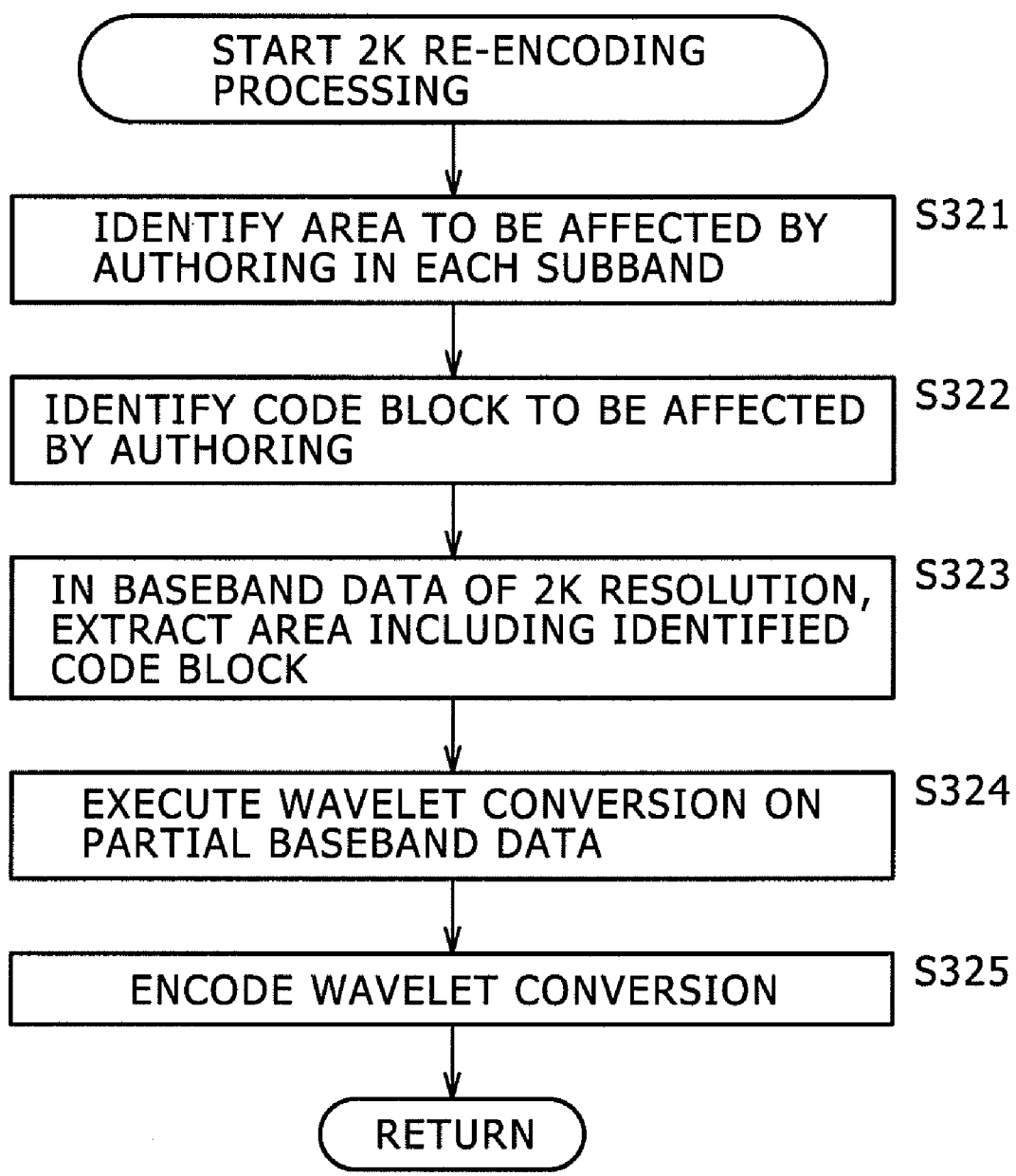
FIG. 18 is a flowchart indicative of another exemplary flow of 2K re-encoding processing.

The following describes an exemplary flow of 2K re-encoding processing that is executed in step S313 shown in FIG. 17, with reference to a flowchart shown in FIG. 18.

When 2K re-encoding processing starts, the replacement code block identifying block 371 identifies the position, in the baseband of a 2K-resolution frame image, of the 2K-resolution partial baseband data generated in step S311, in each subband obtained when recursive wavelet transform has been executed by a predetermined number of times. Namely, the replacement code block identifying block 371 identifies an area of the subbands obtained by executing recursive wavelet transform on the baseband of a 2K-resolution frame image by a predetermined number of times, the area being affected by the authoring processing. If wavelet transform and coding conditions are constant, the positional relation between each item of data of the baseband data and each wavelet coefficient obtained by executing wavelet transform on that baseband is constant. Therefore, in this case, by preparing rule information such as transform table and transform equation for example, the replacement code block identifying block 371 can, by use of this rule information, easily obtain the area the coefficients of subbands corresponding to the authoring area from the position (namely, the position of the authoring area) of the partial baseband data, in the baseband of a frame image, without actually executing wavelet transform.

In step S322, on the basis of the area of the coefficient of each subband corresponding to the authoring area obtained in step S321, the replacement code block identifying block 371 identifies a replacement code block that is affected by the authoring processing. To be more specific, the replacement code block identifying block 371 identifies a code block that includes the coefficients obtained in step S321 in the lowest subband and then identifies a code block corresponding to the identified code block in each subband. If the position of the coefficient of each subband has been identified in step S321, the position of each target replacement code block can be identified on the basis of the obtained positional information. Therefore, by preparing the rule information such as transform table and transform equation for example, the replacement code block identifying block 371 can easily obtain replacement code blocks on the basis of this rule information.

As described above, by fixing the wavelet transform and coding conditions, the replacement code block identifying block 371 can identify the replacement code blocks (the code blocks that are affected by the authoring processing) corresponding to the authoring area on the basis of predetermined rules. Therefore, by preparing such rule information including transform table and transform equation as identifying replacement code blocks from the position of partial baseband data with the noise component canceled, the replacement code block identifying block 371 may also execute the processes of steps S321 and S322 at a single transform operation.

When the replacement code block identification has been done, the baseband area extracting block 372 extracts an area containing the identified replacement code blocks in 2K-resolution baseband data in step S323. The baseband area extracting block 372 obtains a range corresponding to the identified replacement code blocks in the 2K-resolution baseband data and extracts the data in that range from the 2K-resolution baseband data generated in step S301.

In step S324, the DWT block 373 recursively executes wavelet transform, by a predetermined number of times, on the partial baseband data extracted in step S323. In step S325, the encoding block 374 encodes, in a predetermined method, the wavelet coefficient obtained in step S324.

As described above, the image processing apparatus 300 executes noise component detection with 2K resolution that is lower than inherent 4K resolution and decodes merely the part that contains a noise component with 4K resolution, thereby executing authoring processing. Consequently, as compared with the 4K-resolution decoding, noise component cancellation, and re-encoding of the code stream of an entire frame image, the image processing apparatus 300 can reduce the load of each process, the processing time, and the memory size necessary for data retention for the code stream decoding, noise component cancellation, and baseband data re-encoding that accompany this authoring processing. To be more specific, the image processing apparatus 300 can execute the authoring processing more easily than the manner of processing in which an entire frame is decoded with 4K resolution for authoring processing.

It should be noted that, as compared with the image processing apparatus 200, the image processing apparatus 300 can also reduce the amount of data to be replaced and lower the change in images that is caused by authoring or replacement. Depending on the quantity of noise components contained in images, the image processing apparatus 300 can reduce the load and processing time of each processing such as authoring and reduce the memory size necessary for data retention as compared with the image processing apparatus 200.

In the above-mentioned examples, decoding is executed with 4K resolution so as to cancel the noise component of 4K-resolution subband, it is also practicable to cancel the noise component contained in 4K-resolution subband in the form of a code stream.

Figure 19:
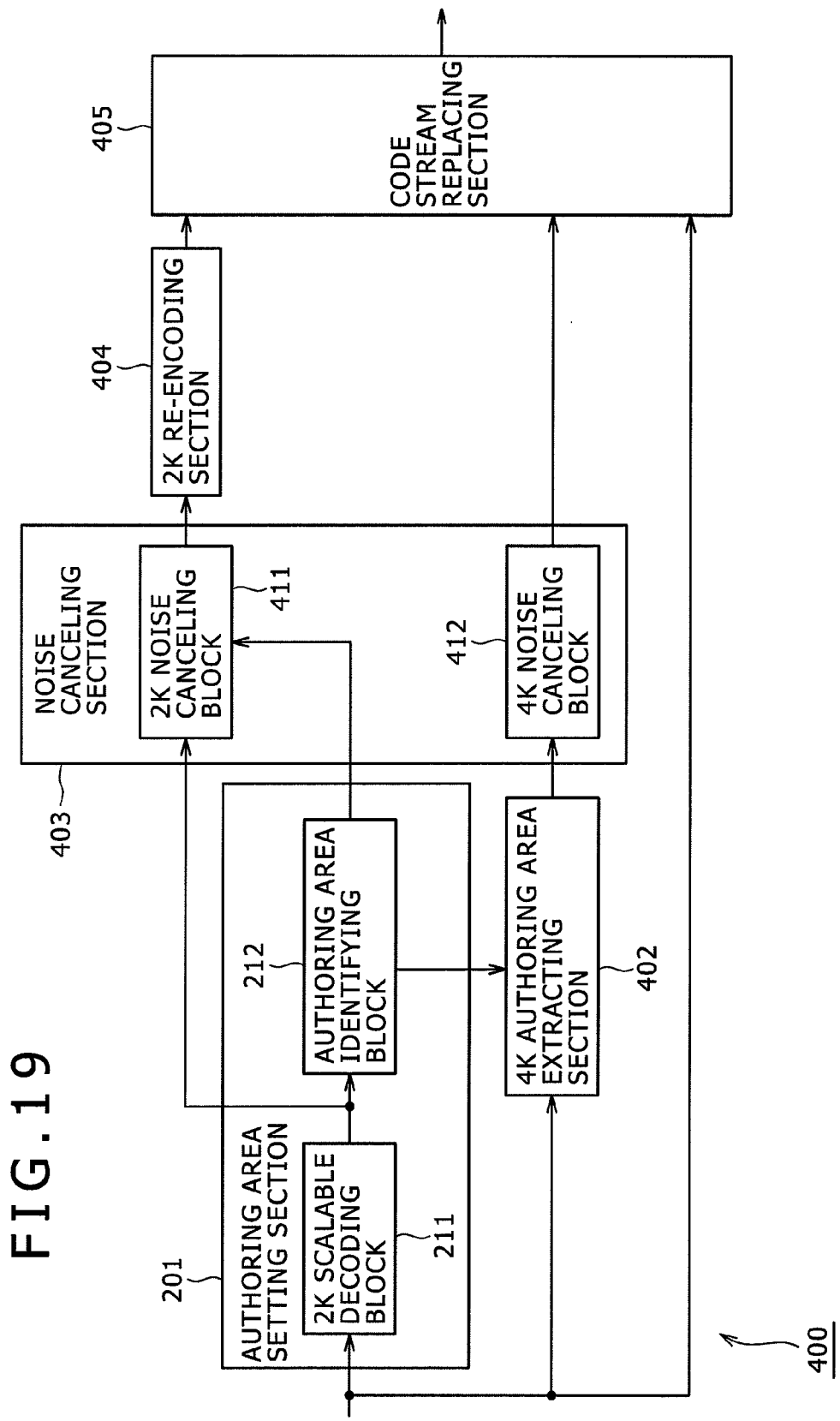
FIG. 19 is a block diagram illustrating an exemplary configuration of an image processing apparatus practiced as still another embodiment of the invention.

Referring to FIG. 19, there is shown a block diagram illustrating an exemplary configuration of an image processing apparatus practiced yet another embodiment of the invention. With reference to FIG. 19, components similar to those previously described with FIG. 5 are denoted by the same reference numerals. An image processing apparatus 400 shown in FIG. 19 is configured to cancel noise from each frame image of image data like the image processing apparatus 100 shown in FIG. 2. However, the image processing apparatus 400 detects a noise component by use of baseband data at 2K resolution, executes authoring processing for canceling the detected noise component, and authors the noise component contained in 4K-resolution subband in the form of a code stream to cancel this noise component.

The image processing apparatus 400 has a 4K authoring area extracting section 402, a noise canceling section 403, a 2K re-encoding section 404, and a code stream replacing section 405, in addition to a authoring area setting section 201 as shown in FIG. 201.

A code stream 450A that is entered in the image processing apparatus 400 is made up of 2KS 451A that is a code stream having 2K resolution and 4KSHL 452A, 4KSLH 453A, and 4KSHH 454A that are code streams of subbands having 4K resolution, as shown in FIG. 20A. As shown in FIG. 17B, 2KBB 451B that is baseband data of a 2K-resolution frame image is created by the 2K scalable decoding block 211 and an authoring area containing a noise component is set by a authoring area identifying block 212 (a partial image 455A shown in FIG. 20B).

The 4K authoring area extracting section 402 executes substantially the same processing as that by the 4K authoring area extracting block 222 shown in FIG. 5, thereby extracting a code block containing the authoring area identified by the authoring area identifying block 212 and supplying the extracted code block to a 4K noise canceling block 412 of the noise canceling section 403. To be more specific, in the example shown in FIG. 20, as shown in FIG. 20C, the 4K authoring area extracting section 402 extracts a partial code stream 456A, a partial code stream 457A, and a partial code stream 458A of 4K-resolution subbands spatially corresponding to a partial image 455A having 2K resolution.

It should be noted that, in this image processing apparatus 400, the noise component of each 4K-resolution subband is cancelled in the form of a code stream (that is, no inverse wavelet transform is executed), so that the extraction of any surrounding code blocks containing no authoring area need not be extracted unlike as shown in FIG. 7.

The noise canceling section 403 executes authoring processing for canceling the noise component detected by the authoring area identifying block 212. The noise canceling section 403 has a 2K noise canceling block 411 and a 4K noise canceling block 412.

For the authoring area, identified by the authoring area identifying block 212, of the baseband data of the 2K-resolution frame image generated by the 2K scalable decoding block 211, the 2K noise canceling block 411 cancels the noise component by executing predetermined image authoring processing such as filtering and replacing for example and supplies the baseband data (2KBB 451C shown in FIG. 20D) of the 2K-resolution frame image with the noise component cancelled to the 2K re-encoding section 404. Namely, a partial image 455B contained in the 2KBB 451C shown in FIG. 20D is an image with the noise component cancelled from the partial image 455A.

The 4K noise canceling block 412 cancels noise components from the partial code streams of 4K-resolution subband of the code block containing the authoring area extracted by the 4K authoring area extracting section 402 (the code streams 456B through 458B shown in FIG. 20D). The 4K noise canceling block 412 executes noise cancellation by replacing a partial code stream supplied from the 4K authoring area extracting section 402 by a partial code stream spatially corresponding to preceding and succeeding frame images or by a partial code stream copied from a neighboring code block, for example. Any noise component cancellation method may be used as long as noise cancellation can be made in the form of a code stream.

The 2K re-encoding section 404 encodes, by JPEG 2000, the baseband data of the 2K-resolution frame image with the noise component cancelled by the 2K noise canceling block 411 and supplies the code stream (2KS 451D shown in FIG. 20E) of the 2K-resolution frame image to the code stream replacing section 405. By this encoding, the partial image 455B shown in FIG. 20D is transformed into a code stream 455C shown in FIG. 20E. It should be noted that, actually, the partial code stream 455C is divided for each subband by wavelet transform.

The code stream replacing section 405 replaces the code stream of the 2K-resolution frame image of the code stream entered in the image processing apparatus 400 by the data supplied from the 2K re-encoding section 404 and then replaces, of the code streams of 4K-resolution subband of the code stream entered in the image processing apparatus 400, a code block containing a part spatially corresponding to the authoring area by the data supplied from the 4K noise canceling block 412, outputting the replaced data outside the image processing apparatus 400.

To be more specific, a code stream 450B outputted from the code stream replacing section 405 is made up of a code stream 451D of 2K-resolution frame image having a 2K-resolution partial code stream 455C with the noise component cancelled, 4KSHL 452B that is a code stream of 4K-resolution subband having a partial code stream 456B of 4K-resolution subband with the noise component cancelled, 4KSLH 453B that is a code stream of 4K-resolution subband having a partial code stream 457B of 4K-resolution subband with the noise component cancelled, and 4KSHH 454B that is a code stream of 4K-resolution subband having a partial code stream 458B of 4K-resolution subband with the noise component cancelled.

It should be noted that the code stream replacing section 405 updates, as desired, the information associated with code length and zero bit plane count contained in the packet header of the part with data replaced.

Figure 21:
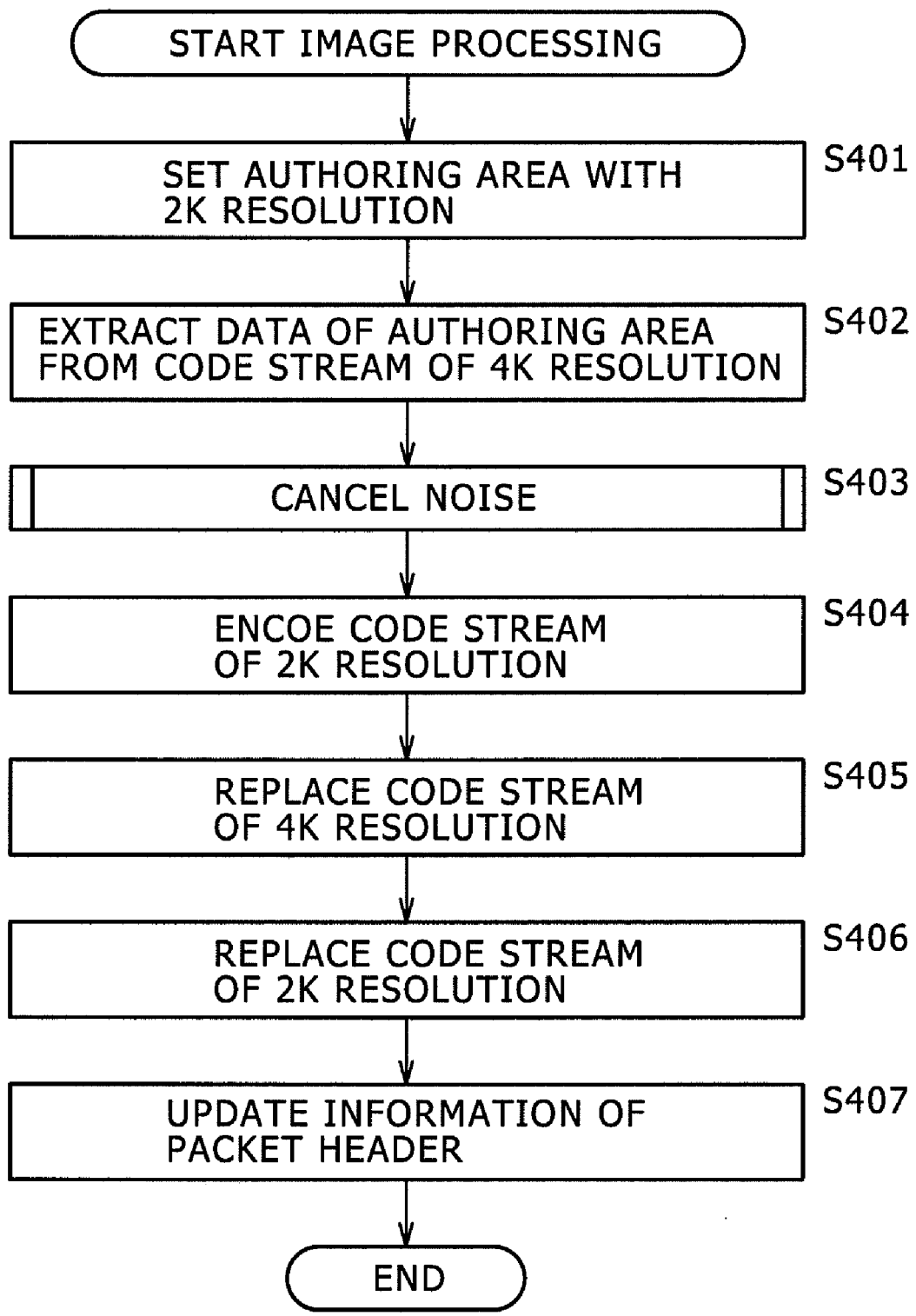
FIG. 21 is a flowchart indicative of still another exemplary flow of image processing.

The following describes an exemplary flow of the image processing for canceling a noise component from each frame image, with reference to a flowchart shown in FIG. 21.

When the image processing starts, the authoring area setting section 201 executes authoring area setting processing to set an authoring area with 2K resolution in step S401. It should be noted that the details of this authoring area setting processing are substantially the same as those previously described with reference to the flowchart shown in FIG. 9, so that the description thereof will be skipped. In step S402, the 4K authoring area extracting section 402 extracts a partial code stream of a part spatially corresponding to the authoring area from a code stream of 4K-resolution subband.

In step S403, the noise canceling section 403 executes noise cancellation processing to cancel the noise component from the image.

In step S404, the 2K re-encoding section 404 encodes, by JPEG 2000, the baseband data of the 2K-resolution frame image with the noise component cancelled by the 2K noise canceling block 411.

In step S405, for each 4K-resolution subband of the code stream entered in the image processing apparatus 400, the code stream replacing section 405 identifies a part corresponding to the partial code stream with the noise component cancelled by the processing of step S403 and replaces the identified part (namely, the code stream containing the noise component) by the partial code stream with the noise component cancelled by the process of step S403. In addition, in step S406, the code stream replacing section 405 replaces a code stream (namely, a code stream containing a noise component) of each subband having a resolution lower than 2K of the code stream entered in the image processing apparatus 400 by the code stream (namely, the code stream with the noise component cancelled) of the 2K-resolution frame image generated by encoding by the process of step S404. Further, in step S407, the code stream replacing section 405 appropriately updates the information associated with code length and zero bit plane count in the header of the packet containing the replaced code block.

When the processing of step S407 has been completed, the above-mentioned image processing comes to an end. It should be noted that this image processing is executed on each frame image of the image data that is entered in the image processing apparatus 400.

Figure 22:
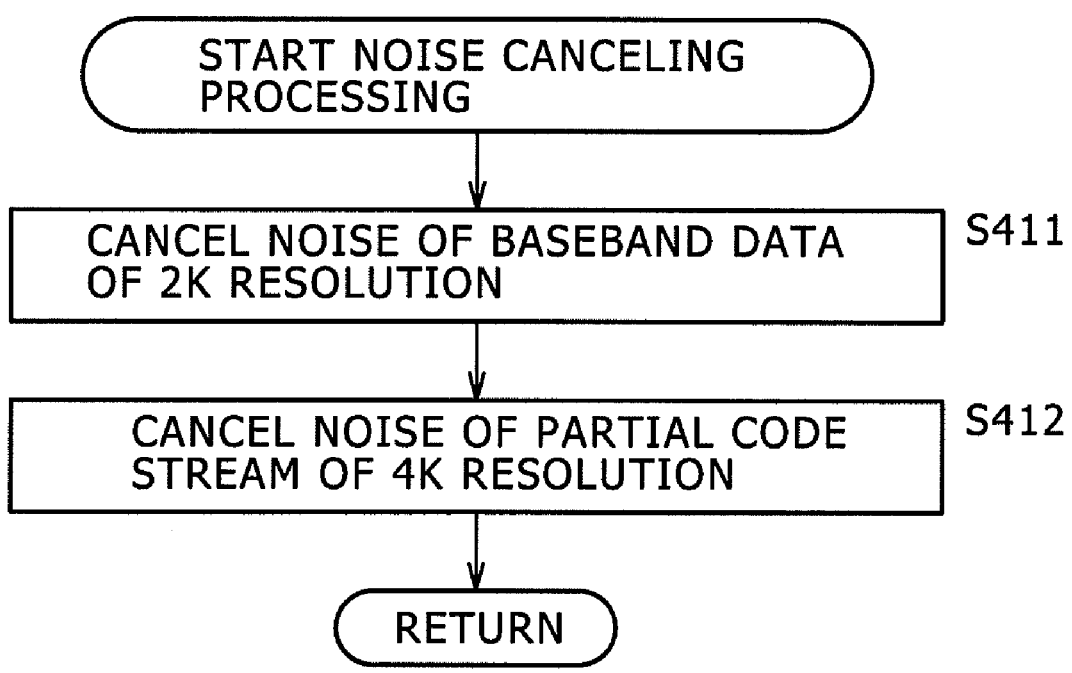
FIG. 22 is a flowchart indicative of an exemplary flow of noise canceling processing.

The following describes an exemplary flow of noise cancellation processing that is executed in step S403 shown in FIG. 21, with reference to a flowchart shown in FIG. 22.

When the noise cancellation processing starts, the 2K noise canceling block 411 cancels, in step S411, the noise component of the authoring area, set by the process of step S401, of the baseband data of the 2K-resolution frame image. In step S412, the 4K noise canceling block 412 replaces the noise component of the partial code stream of each 4K-resolution subband extracted by the process of step S402 by other data, thereby canceling the noise component in the form of the code stream.

When the process of step S412 has been completed, the noise cancellation processing comes to an end, upon which the procedure is returned to step S403 shown in FIG. 21 to repeat the above-mentioned processing from step S404.

As described above, the image processing apparatus 400 executes noise component detection with 2K resolution that is lower than inherent 4K resolution and decodes merely the part that contains a noise component with 4K resolution, thereby executing authoring processing. Consequently, as compared with the 4K-resolution decoding, noise component cancellation, and re-encoding of the code stream of an entire frame image, the image processing apparatus 400 can reduce the load of each process, the processing time, and the memory size necessary for data retention for the code stream decoding, noise component cancellation, and baseband data re-encoding that accompany this authoring processing. To be more specific, the image processing apparatus 400 can execute the authoring processing more easily than the manner of processing in which an entire frame is decoded with 4K resolution for authoring processing.

It should be noted that, as compared with the image processing apparatus 200 and the image processing apparatus 300, the image processing apparatus 400 can omit the decoding and encoding processes to be executed on 4K-resolution subband. Consequently, the image processing apparatus 400 can reduce the load and processing time of each processing such as authoring and reduce the memory size necessary for data retention as compared with the image processing apparatus 200 and the image processing apparatus 300. However, since the image processing apparatus 400 cancels the noise component of 4K-resolution subband in the form of code stream, the image processing apparatus 200 and the image processing apparatus 300 can execute noise cancellation more correctly than the image processing apparatus 400.

So far, examples have been described in which noise cancellation is executed as an example of authoring processing. However, the contents of authoring processing may be other processing operations as long as scalably encoded data is authored. For example, authoring processing may include the processing of synthesizing images and texts with a frame image. Namely, so far, image processing apparatuses have been described, however, the embodiment of the present invention is also applicable to other apparatuses than image processing apparatuses as long as these other apparatuses are configured to process scalably encoded data.

The data to be authored may be any data as long as scalably encoded, audio data and so on other than image data, for example. In the above description, data is compressed by use of JPEG 2000, it is also practicable to use other data encoding/decoding algorithms as long as these data compression algorithms encode data scalably, for example, MPEG (Moving Picture Experts Group), H.264/AVC, and encoding/decoding based on wavelet transform.

In the above description, there is merely one authoring area, however, it is also practicable to provide two or more authoring areas that equal to the number of noise components, two or more authoring areas per frame image. If two or more authoring areas are set to one frame image, the authoring areas may be processed either discretely or concurrently. For example, processing results and intermediate data obtained in one authoring area may be used for the processing of other authoring areas.

In the above description, 4K and 2K resolutions are used for example. However, 4K resolution is one example of high resolution and 2K resolution is one example of low resolution, so that any other resolutions may be used. To be more specific, the embodiments of the present invention may merely process, with a low resolution, the data scalably encoded with a high resolution. For example, it is also practicable to detect, with the lowest resolution, noise in data that can be decoded in three or more steps and cancel the detected noise in a partial image of the highest resolution.

Further, in the above description, image processing is repeatedly executed on a frame image basis, however, it is also practicable to repeat image processing in a smaller unit than a frame image or process two or more frame images in a single image processing operation.

In the above description, the description of quantization processing for encoding and the description of de-quantization processing for decoding are omitted for the brevity of description, obviously, it is practicable to execute quantization processing for encoding and de-quantization processing for decoding.

The above-described sequence of processing operations may be executed by hardware or software. When the above-mentioned sequence of processing operations is executed by software, the programs constituting the software may be installed in a computer as shown in FIG. 23, for example, for execution.

Figure 23:
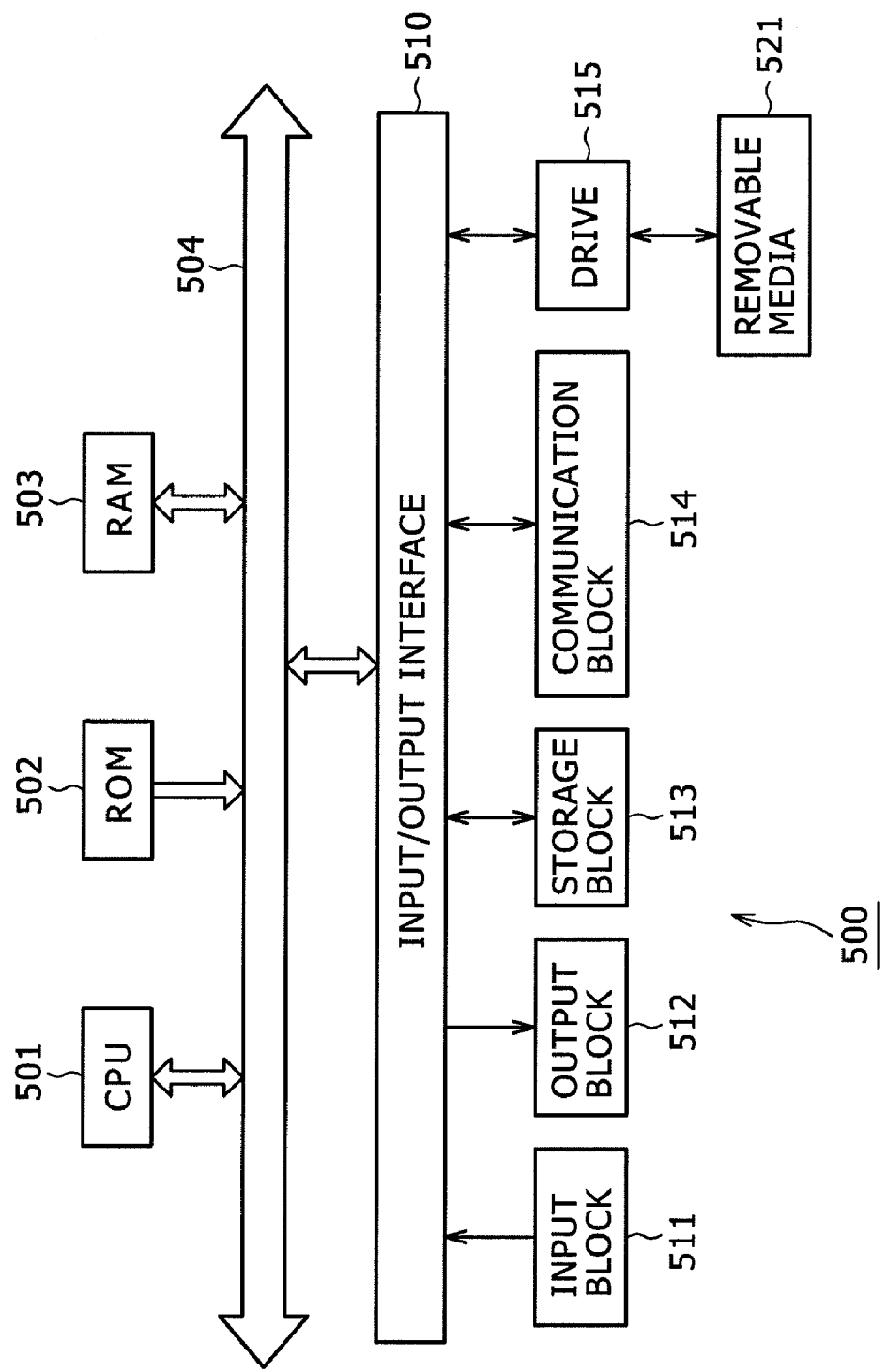
FIG. 23 is a block diagram illustrating an exemplary configuration of a personal computer to which the embodiment of the present invention is applied.

Referring to FIG. 23, a CPU (Central Processing Unit) 501 of a personal computer 500 executes various kinds of processing as instructed by programs stored in a ROM (Read Only Memory) 502 or programs loaded from a storage block 513 into a RAM (Random Access Memory) 503. The RAM 503 also stores, from time to time, data desired for the CPU 501 to execute various kinds of processing.

The CPU 501, the ROM 502, and the RAM 503 are interconnected via a bus 504. The bus 504 is also connected with an input/output interface 510.

The input/output interface 510 is connected with an input block 511 made up of a keyboard and a mouse, for example, an output block 512 made up of a display monitor based on CRT (Cathode Ray Tube) or LCD (Liquid Crystal Display) and a loudspeaker, for example, the storage block 513 based on a hard disk drive, for example, and a communication block 514 based on a modem, for example. The communication block 514 executes communication processing via a network, such as the Internet, for example.

The input/output interface 510 is connected with a drive 515 as desired, on which a removable media 521, such as a magnetic disk, an optical disk, a magneto-optical disk, or a semiconductor memory is installed. From the loaded removable media, computer programs are read into the storage block 513 as desired.

If the above-mentioned sequence of processing operations is executed by software, the programs constituting the software are installed on the computer from a network or recording media.

The above-mentioned recording medium is configured not merely by the removable medium 521 such as a magnetic disc (including a flexible disc), an optical disc (including CD-ROM (Compact Disc Read Only Memory), DVD (Digital Versatile Disc), a magneto-optical disc (including MD (Mini Disc) (trademark)), or a semiconductor memory recorded with programs for distribution of programs to users separately from the apparatus main, but also by the ROM 502 recorded with programs and a hard disc drive recorded with programs and included in the storage block 513 that are provided to users as incorporated in the apparatus main as shown in FIG. 23.

It should be noted herein that the steps for describing each program recorded in recording media include the processing operations which are executed concurrently or discretely as well as the processing operations which are sequentially executed in a time-dependent manner.

It should also be noted that term "system" as used herein denotes a logical set of a plurality of component units and these component units are not necessary accommodated in a same housing.

It should also be noted that, in the examples described above, one apparatus may be configured as two or more apparatuses or vice versa. The configuration of each apparatus described in the examples above may be added with another configuration. If the configuration or the opera ration as an entire system is substantially the same, a part of the configuration of an apparatus may be included in the configuration of another apparatus. To be more specific, while preferred embodiments of the present invention have been described using specific terms, such description is for illustrative purpose, and it is to be understood that changes and variations may be made without departing from the spirit or scope of the following claims.

What is claimed is:

1. An information processing apparatus configured to process a code stream having a first resolution with data having said first resolution scalably encoded, comprising:

setting means for decoding a code stream having said first resolution with a second resolution that is lower than said first resolution and setting an authoring area in which to execute authoring by use of decoded baseband data having said second resolution;

first creating means for creating a partial baseband data having said first resolution, which is a part of said authoring area, of baseband data having said first resolution obtained by decoding a part of said authoring area of said code stream having said first resolution;

authoring means for executing authoring on said partial baseband data having said first resolution;

second creating means for scalably encoding said partial authored baseband data having said first resolution to create a partial code stream that is a code stream of said authoring area; and code stream replacing means for replacing said part of said authoring area of said code stream having said first resolution by said created partial code stream.

2. The information processing apparatus according to claim 1, wherein said first creating means has first extracting means for extract said part of said authoring area from said baseband data having said second resolution;

second extracting means for extracting said part of said authoring area from said code stream having said first resolution;

decoding means for decoding said part of said authoring area of said code stream having said first resolution extracted by said second extracting means; and inverse wavelet transforming means for executing inverse wavelet transform on said part of said authoring area of said baseband data having said second resolution extracted by said first extracting means and said part of said authoring area of each high-frequency component subband having said first resolution obtained by decoding said part of said authoring area of said code stream having said first resolution by said decoding means to create a partial baseband data having said first resolution.

3. The information processing apparatus according to claim 1 wherein said authoring means executes authoring for canceling a noise component contained in said partial baseband data having said first resolution.

4. The information processing apparatus according to claim 1, wherein said second creating means has wavelet transforming means for executing wavelet transform on said authored partial baseband data having said first resolution with said first resolution;

first encoding means for encoding said part of said authoring area of each high-frequency component subband having said first resolution obtained by said wavelet transform by said wavelet transforming means;

baseband data replacing means for replacing said part of said authoring area of said baseband data having said second resolution obtained by decoding said code stream having said first resolution by said setting means with said second resolution by said part of said authoring area of said baseband data having said second resolution obtained by said wavelet transform executed by said wavelet transforming means; and second encoding means for encoding said baseband data having said second resolution with said part of said authoring area replaced.

5. The information processing apparatus according to claim 1, wherein said second creating means has wavelet transforming means for executing, with said first resolution, wavelet transform on said authored partial baseband data having said first resolution;

first encoding means for encoding said part of said authoring area of each high-frequency component subband having said first resolution obtained by said wavelet transform executed by said wavelet transforming means; and second encoding means for encoding said part of said authoring area of said baseband data having said second resolution obtained by said wavelet transform executed by said wavelet transforming means.

6. An information processing method for an information processing apparatus configured to process a code stream having a first resolution with data having said first resolution scalably encoded, comprising the steps of:

decoding a code stream having said first resolution with a second resolution that is lower than said first resolution and set an authoring area in which to execute authoring by use of decoded baseband data having said second resolution;

creating a partial baseband data having said first resolution, which is a part of said authoring area, of baseband data having said first resolution obtained by decoding a part of said authoring area of said code stream having said first resolution;

executing authoring on said partial baseband data having said first resolution;

encoding scalably said partial authored baseband data having said first resolution to create a partial code stream that is a code stream of said authoring area; and replacing said part of said authoring area of said code stream having said first resolution by said created partial code stream.

7. An information processing apparatus configured to process a code stream having a first resolution with data having said first resolution scalably encoded, comprising:

setting means for encoding a code stream having said first resolution with a second resolution that is lower than said first resolution and set an authoring area in which to execute authoring by use of obtained baseband data having said second resolution;

extracting means for extracting a part of said authoring area from a code stream of each high-frequency component subband having said first resolution contained in said code stream having said first resolution;

authoring means for executing authoring on said extracted part of said authoring area of said code stream of said each high-frequency component subband having said first resolution and a part of said authoring area of said baseband data having said second resolution;

encoding means for scalably encoding said baseband data having said second resolution with said part of said authoring area authored; and replacing means for replacing said part of said code stream having said second resolution of said code stream having said first resolution by said code stream having said second resolution with said baseband data having second resolution with said part of said authoring area authored scalably encoded and replace a part of said authoring area of said code stream of said each high-frequency component subband having said first resolution contained in said code stream having said first resolution by said authored part of said authoring area of said each high-frequency component subband having said first resolution.

8. The information processing apparatus according to claim 7, wherein said authoring means executes authoring of canceling a noise component on both said part of said authoring area of said code stream of said each high-frequency component subband having first resolution and said of said authoring area of said baseband data having said second resolution.

9. The information processing apparatus according to claim 8, wherein said authoring means replaces said part of said authoring area of said code stream of each high-frequency component subband having said first resolution by another predetermined code stream to cancel said noise component.

10. An information processing method for an information processing apparatus configured to process a code stream having a first resolution with data having said first resolution scalably encoded, comprising the steps of:

encoding a code stream having said first resolution with a second resolution that is lower than said first resolution and set an authoring area in which to execute authoring by use of obtained baseband data having said second resolution;

extracting a part of said authoring area from a code stream of each high-frequency component subband having said first resolution contained in said code stream having said first resolution;

executing authoring on said extracted part of said authoring area of said code stream of said each high-frequency component subband having said first resolution and a part of said authoring area of said baseband data having said second resolution;

encoding scalably said baseband data having said second resolution with said part of said authoring area authored; and replacing said part of said code stream having said second resolution of said code stream having said first resolution by said code stream having said second resolution with said baseband data having second resolution with said part of said authoring area authored scalably encoded and replacing a part of said authoring area of said code stream of said each high-frequency component subband having said first resolution contained in said code stream having said first resolution by said authored part of said authoring area of said each high-frequency component subband having said first resolution.

11. An information processing apparatus configured to process a code stream having a first resolution with data having said first resolution scalably encoded, comprising:

a setter configured to decode a code stream having said first resolution with a second resolution that is lower than said first resolution and set an authoring area in which to execute authoring by use of decoded baseband data having said second resolution;

a first creator configured to create a partial baseband data having said first resolution, which is a part of said authoring area, of baseband data having said first resolution obtained by decoding a part of said authoring area of said code stream having said first resolution;

an authorer configured to execute authoring on said partial baseband data having said first resolution;

a second creator configured to scalably encode said partial authored baseband data having said first resolution to create a partial code stream that is a code stream of said authoring area; and a code stream replacer configured to replace said part of said authoring area of said code stream having said first resolution by said created partial code stream.

12. An information processing apparatus configured to process a code stream having a first resolution with data having said first resolution scalably encoded, comprising:

a setter configured to encode a code stream having said first resolution with a second resolution that is lower than said first resolution and set an authoring area in which to execute authoring by use of obtained baseband data having said second resolution;

an extractor configured to extract a part of said authoring area from a code stream of each high-frequency component subband having said first resolution contained in said code stream having said first resolution;

an authorer configured to execute authoring on said extracted part of said authoring area of said code stream of said each high-frequency component subband having said first resolution and a part of said authoring area of said baseband data having said second resolution;

an encoder configured to scalably encode said baseband data having said second resolution with said part of said authoring area authored; and a replacer configured to replace said part of said code stream having said second resolution of said code stream having said first resolution by said code stream having said second resolution with said baseband data having second resolution with said part of said authoring area authored scalably encoded and replace a part of said authoring area of said code stream of said each high-frequency component subband having said first resolution contained in said code stream having said first resolution by said authored part of said authoring area of said each high-frequency component subband having said first resolution.

* * * * *